United States Patent [19]

Cha et al.

[11] Patent Number: 4,983,278
[45] Date of Patent: Jan. 8, 1991

[54] PYROLYSIS METHODS WITH PRODUCT OIL RECYCLING

[75] Inventors: Chang Y. Cha, Laramie, Wyo.; Michael Duc, Abu Dhabi, United Arab Emirates; Curtis J. Hogan, Denver, Colo.

[73] Assignee: Western Research Institute & ILR Services Inc., Laramie, Wyo.

[21] Appl. No.: 333,838

[22] Filed: Apr. 3, 1989

Related U.S. Application Data

[63] Continuation of Ser. No. 116,327, Nov. 3, 1987, abandoned.

[51] Int. Cl.$^5$ .................................................. C10G 1/00
[52] U.S. Cl. ..................................... 208/407; 208/415; 208/427
[58] Field of Search ................ 208/415, 417, 429, 433, 208/434, 427

[56] References Cited

U.S. PATENT DOCUMENTS

| | | |
|---|---|---|
| Re. 32,120 | 4/1986 | Low . |
| 1,607,763 | 10/1928 | Hampton ........................ 208/429 X |
| 3,617,474 | 11/1971 | Stotler ................................. 208/409 |
| 3,644,193 | 2/1972 | Weggel et al. ........................ 201/29 |
| 3,939,057 | 2/1976 | Reed, Jr. . |
| 4,108,760 | 8/1978 | Williams et al. . |
| 4,139,450 | 2/1979 | Hanson et al. . |
| 4,146,460 | 3/1979 | Thomas ............................... 208/427 |
| 4,303,494 | 12/1981 | Whitehurst et al. ............ 208/417 X |
| 4,341,619 | 7/1982 | Poska . |
| 4,354,922 | 10/1982 | Derbyshire et al. ............ 208/434 X |
| 4,401,551 | 8/1983 | Mitchell . |
| 4,415,429 | 11/1983 | Stadelhofer et al. ................ 208/434 |
| 4,441,985 | 4/1984 | Burchfield et al. ................. 208/427 |
| 4,460,452 | 7/1984 | Johnson et al. . |
| 4,490,213 | 12/1984 | Antnony .............................. 208/429 |
| 4,495,057 | 1/1985 | Amirijafari et al. . |
| 4,687,570 | 8/1987 | Sundaram et al. ................... 208/433 |

FOREIGN PATENT DOCUMENTS 2106537 4/1983 United Kingdom ................ 208/415

*Primary Examiner*—Glenn Caldarola
*Attorney, Agent, or Firm*—Browdy and Neimark

[57] ABSTRACT

A two step retorting process for pyrolyzing a solid feed selected from the group consisting of oil shale, tar sand, waste motor oil, and scrap tires to recover valuable products therefrom comprising retorting a mixture of the solid feed in heavy oil at a relatively low temperature, recycling the oil formed back to the first step, and completing the pyrolysis of the residue formed at a higher temperature in the absence of product oil recycling. Apparatus is provided including a means for feeding and soaking the solid feed, a HSPR, an IFBC, and means for handling product liquid and gas.

19 Claims, 14 Drawing Sheets

PYROLYSIS METHODS WITH PRODUCT OIL RECYCLING

This application is a continuation of application Ser. No. 116,327, filed Nov. 3, 1987, now abandoned.

FIELD OF THE INVENTION

The present invention relates to a pyrolysis process for recovering valuable oil products from tar sands, oil shale, scrap tires, and waste motor oil.

BACKGROUND OF THE INVENTION

One of the major obstacles preventing the commercialization of tar sand and oil shale is the high cost associated with mining and processing the solid feed material, upgrading raw crude oil, and refining upgraded crude oil to produce salable products. In order to commercialize tar sand and shale oil recovery while reducing the financial risks, new processing technologies must be developed to obtain the following goals:

Much greater oil yield;
Products that require a minimum of upgrading to produce a finished, marketable fuel;
Advanced fuel feedstocks;
Asphalt binders;

Many processes have been developed to recover oil from tar sand and oil shale, but so far none of these processes has accomplished all of the above objectives.

In 1953, Jensen et al. in "Thermal Solution and Hydrogenation of Green River Oil Shale," Bulletin 533 of the U.S. Bureau of Mines, showed that when oil shale was heated in the presence of a solvent and souluble conversion products were extracted with the solvent rather than distilled from the shale, the rate of kerogen decomposition was significantly increased, and a higher percentage of kerogen was converted to volatile products. This study was performed by treating a slurry of shale oil and pulverized oil shale at about 300 psi pressure and temperatures ranging from 750° to 850° F., for various reaction times. Despite the advantages mentioned above, this thermal-solution process was not considered to be a practical shale oil production process because of the high processing costs associated with the grinding of the shale, the high boiling range of the oil produced, the cracking accompanied by polymerization and condensation of shale oil solvent, and the difficulty of separating the solvent and product oil from the spent shale.

Some of the disadvantages of the thermal-solution process described above may be overcome by using larger size oil shale and a recycle shale oil, and by continuously withdrawing oil vapor from the retort. In this case, the bitumen may be continuously removed from the shale particles by retorting the oil shale in the presence of a shale oil to increase the oil yield. Additionally, the heavy oil absorbed in the spent shale may be recovered by heating the shale at temperatures slightly greater than the retorting temperature in the absence of recycled oil. Recovered heavy oil may then be recycled to the retort.

High-density fuels are liquid hydrocarbon mixtures, mostly made up of cyclic saturated hydrocarbons called cycloparaffins. Since these fuels provide more operating miles between refuelings for volume-limited aircraft and tactical ground equipment, these fuels are particularly attractive for military use. These high-density fuels are made by hydrogenating aromatic oils to make cycloparaffins.

Tar sand and eastern oil shale contain a high percentage of aromatic hydrocarbons. Consequently, it is possible to produce oil product containing high concentrations of aromatic compounds from tar sand or eastern oil shale. The aromatic compounds can be produced by retorting the tar sand or eastern oil shales at very high temperatures, or in the presence of heavy oil solvent. A number of solvent extraction processes have been developed for recovering oil from tar sand and oil shale. All of the existing solvent extraction processes for oil shale require high pressure. The solvent extraction processes for tar sand produce the bitumen which requires an extensive treatment to be a marketable fuel. As a result, the operation and capital costs are too high for existing solvent extraction processes to be competitive with natural crude oil.

Reed, Jr., in U.S. Pat. No. 3,939,057, discloses a process for obtaining petroleum products from oil shale by retorting crushed oil shale admixed with a small quantity of crushed coal in an indirectly heated, rotary calciner. The oil free shale is fed to a furnace where it is burned to produce the heat for retorting and preheating the shale.

Mitchell, in U.S. Pat. No. 4,401,551, discloses a method for extracting oil from shale comprising contacting previously recovered bitumen with bituminous sand and separating the resulting liquids from the resulting solids. This process is conducted in a vertically oriented bed.

Williams et al., in U.S. Pat. No. 4,108,760, disclose a process for extracting oil shales and tar sands by heating the shale in the presence of an extractant gas at a temperature ranging from 0° to 550° C. to extract extractable cnstituents, separating the extract from the extractant and recycling the extractant, wherein at the extraction temperature the extractant is above its critical temperature by not more than 200° C. The extraction bed may comprise a fluidized bed system.

Amirijafari et al., in U.S. Pat. No. 4,495,057, disclose a combination thermal and solvent extraction oil recovery process. Simultaneously operating thermal and solvent extraction operations are arranged in parallel, and each receives a stream of tar sand crushed to a different fineness. Heat from the spent sand is used to raise the temperature of the sand and relatively heavy oil-solvent mixture produced in the solvent extraction operation and to recover solvent from the sand and oil products taken from the extraction operation to increase the overall energy efficiency of the operation. Lighter oil from the thermal operation is blended with the heavier oil product from the solvent extraction operation. The oil product from the thermal operation is suitable for providing a make-up solvent in the solvent extraction operation, which is recycled in a closed, solvent-circulating system back to the solvent extraction unit.

The tire industry produces and sells about 240 million tires annually. Of all of the tires removed from vehicles, about 30% are consumed in various ways: used tire market, recap market, rubber reclaim market, found rubber, and other uses. The other 70% are dumped in landfills or junk yards. Scrap tires used as landfill have no economic value and present health, safety, environmental, and handling problems. Tires do not biochemically degrade sufficiently when buried, and may resurface in landfills, providing an excellent breeding ground for vermin and mosquitoes.

Accidental fires in some landfills have polluted both air and groundwater resources, and fires are different and expensive to extinguish. For this reason, landfills may charge per tire for disposal. To avoid disposal in landfills, many metropolitan areas have accumulated large stockpiles of scrap tires, and these stockpiles are maintained by charging a collection fee similar to the disposal fee.

A number of alternatives exist to disposal of waste tires. Worn tires can be sold as used tires or recapped for continued use as a tire. Worn tires can be used as artificial reefs, highway crash barriers, or children's swings. Splitting, grinding, and rubber reclamation are other uses for worn tires. Whole or shredded tires can be burned directly or pyrolyzed for energy recovery.

Since a single tire contains about 300,000 Btu's of energy, the dumped tires represent about $5 \times 10^{13}$ Btu of usable energy annually, a sizable resource.

Heretofore, the economics of tire pyrolysis appear marginal, at best, except in a few specific instances: where high tire disposal costs, low tire acquisition costs, and significant on-site energy savings can be realized; or where higher value products such as benzenetoluene are refined from the pyrolytic oil.

Although several technologies, including thermal and chemical degradation of tire rubber, have been used for many years, there is still much progress to be made in this area. Other technologies that are currently being researched are microwave devulcanization and microbiological degradation.

The scrap tire problem has been studied considerably because each tire represents a significant quantity of energy, not only in terms of heat recoverable through direct combustion, but also in terms of the energy consumed in processing petroleum and natural gas into the principal constituents of tires—carbon black, extender oil, and elastomer. Recovery of part of this energy content in a form with the highest possible value, i.e., crude oil or chemical feedstock, would provide a valuable resource and also alleviate a growing environmental problem.

Reclamation of waste rubber by microwave treatment is the subject of U.S. Pat. Nos. 4,250,158 and 4,284,616. Only fair success has been obtained with waste tires as feed after the metal and tire fabric were removed.

Of the currently feasible processes for recovering the energy of waste tires, combustion and pyrolysis appear to be two processes that can be employed on a large enough scale to have an important impact on the problem in the short term. The decision between pyrolysis and combustion has heretofore depended upon the required end use. For example, tire combustion is better suited to the production of process heat, since combustion directly releases about 75% of the combustion energy in the tire. A comparable overall combustion efficiency for pyrolysis is about 66%.

Direct combustion and asphalt modifiers are the simplest. Scrap tires have a heating value of about 15,000 Btu/lb, but the scrap tires contain about 2.5% volume sulfur, which reduces their economic value as fuel. When finely shredded, the scrap tires improve the elasticity of asphaltic pavements, but the cost of finely shredding steel-belted tires are too high. The current use of shredded tires as an asphalt filler is limited to only the tire tread that is removed in normal scrapping operations.

Another potential alternative for scrap tire disposal is microbiological conversion. Nickerson, at the Institute of Microbiology at Rutgers University, and the Firestone Tire and Rubber Company have reported the results of studies of fermentation of scrap tire vulcanizates. Natural rubber has been known to be attacked by microorganisms as early as 1914, and definite indications of synthetic rubber degradation were noted in their experiments.

A highly desirable point of attack for microorganisms would be the sulfur-carbon bonds created by vulcanization. If the chemically combined sulfur could be removed without significant depolymerization, the resulting product would be a superior grade of reclaimed rubber, a relatively high-value product. Although no reported work appears to exist, specific species of mircoorganisms could be isolated that would metabolize the tire matrix and produce a valuable chemical byproduct, i.e., organic acids, fuel, or monomers.

A chemical or radiation pretreatment could accelerate the microbial digestion of tire polymeric material by random cleaving of the large highly reduced molecules. Increased kinetics of degradation would benefit the economic feasibility of any such process.

In U.S. Pat. No. 4,384,151, there is described a process and apparatus for converting waste tires to fuels. Whole tires are treated by means of heavy oil flowing thereon, without immersion in a bath of oil. Fuel oil is used for this process, and there is no recycling of heavy oil. Carbon black is not recovered from this process.

Pneumatic tires contain the following components: vulcanized rubber, a rubberized fabric containing reinforcing textile cords, steel or fabric belts, and steel-wire-reinforced rubber beads. The tires are constructed on a mold. The first layer is rubber, followed by the two beads and a number of plies of the fabric, followed by another layer of rubber, with a thick circumferential layer of tread rubber. The assembly is cured by heat in a mold that contains the tread pattern and the information embossed on the sidewalls of the tire. Most modern tires are of belted radial construction, wherein the fabric cords are oriented radially and a circumferential steel, fiberglass, or fabric belt overlays the cords and underlays the tread rubber.

The most commonly used tire rubber is styrene-butadiene copolymer (SBR), which contains about 25% by weight of styrene. In combination with SBR, other elastomers such as natural rubber (cis-polyisoprene), synthetic cis-polyisoprene, and cis-polybutadiene, are also used in tires in varying amounts. A typical recipe for tire rubber is as follows:

| Component | Wt % |
| --- | --- |
| SBR | 62.1 |
| Carbon black | 31.0 |
| Extender oil | 1.9 |
| Zinc oxide | 1.9 |
| Stearic acid | 1.2 |
| Sulfur | 1.1 |
| Accelerator | 0.7 |

The carbon black acts primarily to strengthen and impart abrasion resistance to the rubber. The extender oil is usually a mixture of aromatic hydrocarbons having the primary function of softening the rubber to make it more workable. The sulfur molecules react with the double bonds in adjacent polymer chains to cause cross-linking, which hardens the rubber and prevents excessive deformation at elevated temperatures. The accelerator acts as a catalyst for the vulcanization process and is typically an organosulfur compound such as 2-mercaptobenzothiazole. The zinc oxide and stearic acid, in addition to enhancing the physical properties of the rubber, also act in harmony with the accelerator to control the vulcanization process.

The marketability of tires depends on two dominant characteristics, tread life and traction. To some extent, these characteristics are incompatible, since all other things being equal, the softer the tread rubber, the better the traction, but the worse the tread life, and vice versa. Nevertheless, tire manufacturers can vary several parameters, such as tread depth, amount and quality of the carbon black, extent of vulcanization, amount of extender oil, relative amounts of different elastomers, and other known only to individual tire manufacturers, to achieve the best combination of tread life and traction. With so many variables, it is impossible to know the exact composition of a particular used tire, so that a complete knowledge of the mechanism of tire pyrolysis is not available.

Two characteristics that all vulcanizable elastomers have in common are the presence of double bonds in the molecular chains, and a preferred location for thermal rupture of the carbon-to-carbon bonds. The double bond is the characteristic that allows vulcanization to take place, since sulfur reacts and forms a bond between double bonds of adjacent rubber molecules. It is this cross-linking between the molecular chains of elastomer molecules at a controlled number of locations that is responsible for the property of elastomers to regain their shape after deformation. The presence of the double bond also directs the thermal rupture to the beta location relative to the double bond, i.e., the second carbon-carbon bond from the double bond. When chain rupture propagates along the chain, highly reactive free radicals are formed. The free radicals will tend to be subchains of the original elastomer molecule, and when the process is carried to its logical conclusion, the monomer or monomers from which the elastomer was formed should be produced in significant yield. Since the predominant monomers in worn tires are styrene and butadiene, these are found in the liquid products of pyrolysis. A wide variety of olefins is also produced by thermal cracking. Formation of benzene and toluene can be expected through reactions involving the styrene monomer, along with a wide range of higher aromatics and condensed ring compounds. The temperature and residence time of pyrolysis are important in determining the extent to which high molecular weight compounds are cracked; hence, higher pyrolysis temperatures and longer vapor residence times promote gas production at the expense of the liquid reaction. The solid fraction, which contains zinc oxide or zinc, steel, iron oxide, potentially a number of trace metal, carbon black, and a solid hydrocarbon residue, contains relatively less hydrocarbon residue when the pyrolysis temperature of the solids residence time is increased.

A number of criteria can be used to classify the numerous pyrolysis processes. Among these criteria are the atmosphere within the reactor, the method of heat addition, the reactor type, the process conditions, the required feed preparation, and whether the reactor is batch or continuous. The most important of these criteria is the atmosphere within the reactor, i.e., whether the atmosphere is oxidative or reductive with respect to the tire materials.

Oxidative processes include those that inject air, oxygen, or steam as reactants. Air and oxygen injection result in the combustion of portion of the tire materials to give carbon monoxide, carbon dioxide, and hydrogen, which gives rise to the term "substoichiometric combustion." The relative yield of gas is higher and the heating value of the gas is lower in oxidative processes than in reductive processes. Furthermore, the heat of pyrolysis is furnished by combustion of tire materials, so that the gas evolved need not be burned to heat the reactor. When air rather than oxygen is injected, the nitrogen in the air further degrades the heating value of the gas.

Steam is oxidative with respect to the tire materials. The predominant reactions involve the cracking of hydrocarbons to carbon monoxide, carbon dioxide, and hydrogen, so that a higher value gas product is produced than is the case for a substoichiometric combustion process using air or oxygen as the oxidizer. In contrast to air or oxygen injection, steam injection requires an external source of heat to furnish the heat of reaction for cracking, and this is typically supplied by burning all or a portion of the product gas.

The majority of pyrolysis processes are reductive. Reductive processes include those with hydrogen injection and those that produce a reductive atmosphere by excluding air and other oxidizers. The main effect of adding hydrogen is to desulfurize the tires, thus adding hydrogen sulfide to the gas and reducing the sulfur content of the oil and char. The gas from all reductive processes has a high heating value, in some cases double that of natural gas, and the usual practice is to burn a portion of the gas to heat the reactor.

As scrap tires are received for processing, they are generally shredded into 2- to 6-inch pieces. The shredding process allows some steel to be magnetically separated, but few operators remove steel at this stage of the process. Any of a number of solids transport devices can be used for moving the tire pieces into feed storage, which is typically a hopper that feeds the reactor by gravity through a multiple rotary valve sealing arrangement. Some systems feed whole tires to the reactor, which eliminates the shredder.

Pyrolysis of scrap tires produces gas, liquid, and solid products in varying proportions, depending mainly on pyrolysis temperature. Most of the processes use a portion of the gas product as a heat source for the process. Although the remainder of the gas has a high heating value, it probably cannot be marketed as pipeline gas because of excessive carbon monoxide content. Typically, the gas contains low-molecular-weight paraffins and olefins, hydrogen, carbon monoxide, and hydrogen sulfide. Consequently, this gas could be a feedstock for a number of syntheses or even for carbon black production if the hydrogen sulfide were removed and if some of all of the components were separated and purified.

The division between gas and liquid products is process dependent, depending upon the condensation temperature used to separate liquid from gas. A workable definition of gas product is that it contains most of the hydrocarbons having a carbon number of five and lower. Similarly, the liquid product is specified to contain most of the hydrocarbons having a carbon number six or higher.

The liquid product consists almost entirely of aromatic hydrocarbons, with about 26% by weight of either benzene or toluene. The balance consists of higher molecular weight aromatics. It is conceivable that benzene and toluene could be separated from the liquid product with sufficient purity to be petrochemical feedstocks, but the most likely market for the benzene and toluene content is as a high octane gasoline blending stock. The heavy oil fraction (the portion of the liquid product that remains after the benzene and toluene have been removed) can be used as an extender oil for tire rubber, or it could be catalytically cracked to yield more benzene, toluene, and xylenes for gasoline blending. Another use for this fraction is as a liquid fuel comparable to No. 6 fuel oil.

The solid product is essentially carbon, ash, sulfur, and relatively nonvolatile hydrocarbons, and it is usually referred to as "char." The carbon black may be recovered in essentially its original form.

Carbon black is essentially particulate amorphous carbon: it is produced primarily by the furnace process, wherein hydrocarbon-air mixtures are partially burned to give carbon black and combustion products. The carbon black is recovered by electrostatic precipitation and cyclones. Although other properties of carbon black, such as surface area, particle shape, purity, and the like, influence its marketability as an ingredient for tire building and other uses, the most important characteristic for a furnace black appears to be particle size. The finer the particles, the better the rubber-reinforcing properties, with the lowest grade designated as SRF (semireinforcing furnace) and the highest grade SAF (super abrasion furnace).

The quantity of waste motor oil removed from vehicles is increasing every year in many countries. Because of reduced energy prices, little economic incentive presently exists to reprocess the waste motor oil. Therefore, the waste motor oil prevents serious disposal problems.

Waste motor oil cannot be used as a boiler fuel because of its high metal content. Refining the waste motor oil is not economical, largely because of the high cost of transporting waste oils to a refining facility and too low a volume of waste oil production in individual metropolitan areas.

Pyrolysis of scrap tires to produce oil, gas, and carbon black has previously been tested in both laboratory and pilot-scale equipment. However, this research has focused on older technologies which operate at nearly isothermal conditions. In these processes, higher oil yields are obtained at low pyrolysis temperatures, but the carbon black quality is better at higher temperatures. In addition to this poor economic tradeoff in product yields and quality, these processes require relatively fine shredding of the tires and high capital investments for small-scale operations.

It can be seen from the above that tire pyrolysis is a technologically effective method of reclaiming some energy, some petrochemical products, and other products from the large numbers of tires stockpiled or discarded in landfills as wells as from waste motor oil.

SUMMARY OF THE INVENTION

It is an object of the present invention to overcome the above mentioned deficiencies in the prior art.

It is another object of the present invention to provide an efficient and economical method for obtaining valuable oil products from oil shale, scrap tires, waste oil, and tar sands.

It is still further object of the present invention to provide a process for obtaining oil from scrap tires, oil shale, waste oil, and tar sands in greater yield than ever before as well as for producing upgrading fuel feedstocks and asphalt binders.

It is yet a further object of the present invention to provide an improved two-step process for pyrolyzing scrap tires, oil shale, waste oil, and tar sands wherein the heavy oil from the second step is recycled into the first step.

The process of the present invention consists of three major steps:
1. retorting the product to be pyrolyzed, i.e., tar sand, oil shale, or scrap tires, at a first temperature with product recycling;
2. completing the pyrolysis of the residue from the first step at a higher temperature in the absence of product oil recycling; and
3. combusting the solid residue and pyrolysis gas in an inclined fluidized-bed reactor to produce the heat required for the process.

The overall process flow diagram is shown in FIG. 1. The process is divided into the following subsystems:
 feeding and soaking of solid feed;
 horizontal screw pyrolysis reactor (HSPR);
 inclined screw pyrolysis reactor (ISPR);
 inclined fluid bed combustor (IFBC);
 liquid and gas handling.

Crushed and screened solid feed (oil shale, tar sand, or scrap tires) is mixed with heated middle and heavy distillates (product oil or waste oil) in a feed hopper. In the case of tar sand, most of the bitumen is extracted by the recycled product oil. The solid feed in the hopper is soaked with the product oil, or waste oil and the absorbed product oil can extract the bitumen when the kerogen is pyrolyzed in the HSPR. Oil shales, particularly eastern oil shales, are particularly good absorbents.

The materials are pyrolyzed in the presence of hot recycle oil or waste oil in a simple reactor. The reactor design of the present invention does not require fine shredding of the tires, and permits nonisothermal operation. High oil yields are achieved by recovering most of the oil vapor at low temperatures, and char quality is improved by secondary pyrolysis at high temperatures.

The product oils from the process of the present invention is almost entirely gasoline and diesel fuel with a high aromatic content in the gasoline fraction. The gasoline can be used directly as a high octane blending component, or the aromatics can be extracted as high-value industrial chemicals. In addition, the carbon black is a useful additive for asphaltic pavements, improving the wear resistance and reducing low-temperature cracking and high-temperature distortion. Oxidation inhibitors such as zinc oxide which are used in tire manufacturing are recovered with the carbon black, and may also improve the aging characteristics of the asphalt.

The mixture of solid and product oil or waste oil is fed into the first section of the HSPR by the screw conveyor. For tar sand, the extracted bitumen is fed with the sand into the HSPR. The product oil or waste oil extracts the bitument and weakens the stickiness of unconsolidated tar sand, such as Asphalt Ridge tar sand, so that it can be fed easily by the screw conveyor.

The HSPR consists of three separately controlled heating zones. The temperature of each zone is controlled by controlling the temperature and flow rate of recycled heavy oil. The range of temperature for each zone is as follows:
 first zone, 450°–500° F.;
 second zone, 650°–750° F.;

third zone, 725°-800° F.

External heaters may be used in addition to heated recycled heavy oil in order to maintain the required temperature for each of the three zones. Each zone is equipped with a heated recycle heavy oil inlet, external heater, recycle gas inlet, condenser, and condensate collection tank.

The oil and water vapors flowing from three zones are condensed in the demisters and collected in the condensate tanks. The heavy distillate and a part of middle distillate are recycled to the feed hopper to soak the solid feed and to provide the oil seal for preventing the gas leakage. A part of noncondensible product gas is recycled to each of three zones and the ISPR to sweep the vapor. The remainder of the product gas flows into the IFBC and is burned with the retorted solid feed to provide the heat needed for the process. The liquid oil product flows out the top of the HSPR and is collected in the oil tank.

The rate of heavy oil flow from the HSPR is controlled to be constant by adjusting the middle and heavy distillates recycle rate. The net production rate of heavy oil from the HSPR can also be controlled by controlling the recycle oil rate and third heater temperature. The viscosity of heavy oil is controlled by the heater temperatures.

The retorted solid material is separated from the heavy oil and fed into the ISPR. The heavy oil absorbed on solid material and unconverted organics in the solids are recovered by heating with the hot gas produced from the IFBC to about 950° F. when the solids pass through the ISPR.

The solids leaving the ISPR are collected in a cyclone which serves as the feed hopper for the IFBC. The product gas and oil vapor produced in the ISPR and cyclone flow to the condenser connected to the third zone of the HSPR. The cyclone is well insulated to minimize the heat loss and equipped with double valves to prevent the combustion gas flow from the IFBC to the ISPR.

The ISPR is externally heated by the hot flue gas produced from the IFBC. The hot flue gas leaving the ISPR flows from the oil heater to heat the heavy recycle oil. The hot flue gas leaving the oil heater flows to the heat exchanger to heat the combustion air for the IFBC.

Hot retorted solid material and product gas are fed into the IFBC and burned by the heated air. The burned solids are discharged from the IFBC to the cyclone separator. The hot flue gas is separated from solids in the cyclone and leaves the top of the cyclone separator. The burned solids leave the bottom of the cyclone separator and are conveyed for disposal.

In order to remove sulfur gases from the hot flue gas, a dry sorbent for sulfur such as limestone is added to the inclined fluid bed reactor. As a result, the flue gas need not be treated by a separate system. The organic residue in the retorted solids and product gas provide sufficient heat for the process, although additional fuel can be added to the inclined fluid bed reactor as needed.

The moving-bed pyrolysis reactor system of pyrolyzing scrap tires and waste oil consists of a feed hopper, moving-bed reactor, oil heater, and oil tank. The heated waste motor oil is fed into the oil tank and mixed with heavy product oil. The mixture of heavy product oil and waste motor oil is pumped through an oil heater and heated to about 900° F. (850° F.$\leq$T$\leq$950° F.). The heated oil mixture is fed into the bottom of the moving-bed reactor and flows through the reactor toward the top.

Whole or shredded scrap tires are fed into the top of the moving-bed reactor and move downwardly by gravity. The feed column extends into the oil to provide the seal for preventing the gas leakage. The scrap tires are heated and pyrolyzed by the heated oil as they move through the reactor. The flow rate of product oil and waste motor oil mixture is controlled to maintain the top oil temperature in the range of 500° to 650° F.

The oil and water vapors flowing from the top of the moving-bed are condensed in the demisters and collected in the condensate tank. A noncondensible gas flows into heaters and is burned to provide heat required for the process. The liquid oil product flows out the top of the moving-bed reactor and is collected in the oil tank.

The product gas is a major fuel for the oil heater but a part of the product oil can be burned in the heater if required. The final boiling point of the product oil (distillate) is controlled by controlling the recycle oil flow rate and temperature. The heavy liquid oil will be continuously decomposed into lighter oil when recycled.

The retorted solid material from the bottom of the vertical moving-bed reactor is fed into the ISPR. The solid material is separated from the heavy oil when it moves through the ISPR. The ISPR is heated by the hot flue gas (1400° F.) which flows outside the reactor countercurrent to the solid material. The hot flue gas is produced from the oil heater. The flow rate of hot flue gas is controlled to maintain the temperature of solid material leaving the inclined screw reactor in the range of 900° to 1100° F. The flue gas leaving the inclined screw reactor flows into the heat exchanger to heat the waste motor oil, then to the stack, from which it is vented into the atmosphere.

The heavy oil absorbed on solid material and unconverted organics in the solids are recovered by heating it with the hot flue gas when the solids pass through the inclined screw reactor. The oil vapor leaving the inclined screw reactor is condensed and collected in the oil tank. The solid materials leaving the inclined screw reactor are collected in the wire separator and pass through the magnetic separator which separates the steel from the solid material.

Noncondensible product gas flows with oil vapor from the inclined screw reactor to the demisters. Product gas leaving the demisters is burned in the oil heater. Wires are separated in the wire separator which is equipped with double valves to prevent leakage of oil vapor and product gas from the inclined screw reactor.

The liquid handling system consists of air and water cooled heat exchangers, demisters, oil collection tanks, oil pumps, and an oil heater. The gas handling system consists of compressors, a heat exchanger, and a product gas separator. A simple gas blower is sufficient to handle the product gas since the process system is operated at low pressure (less than 5 psig).

Two separators (wire and small steel piece separators) are used to separate the steel materials from solid materials leaving the inclined screw reactor. After the steel is separate, the solid material contains mostly carbon black.

DETAILED DESCRIPTION OF THE INVENTION

Figure 1:
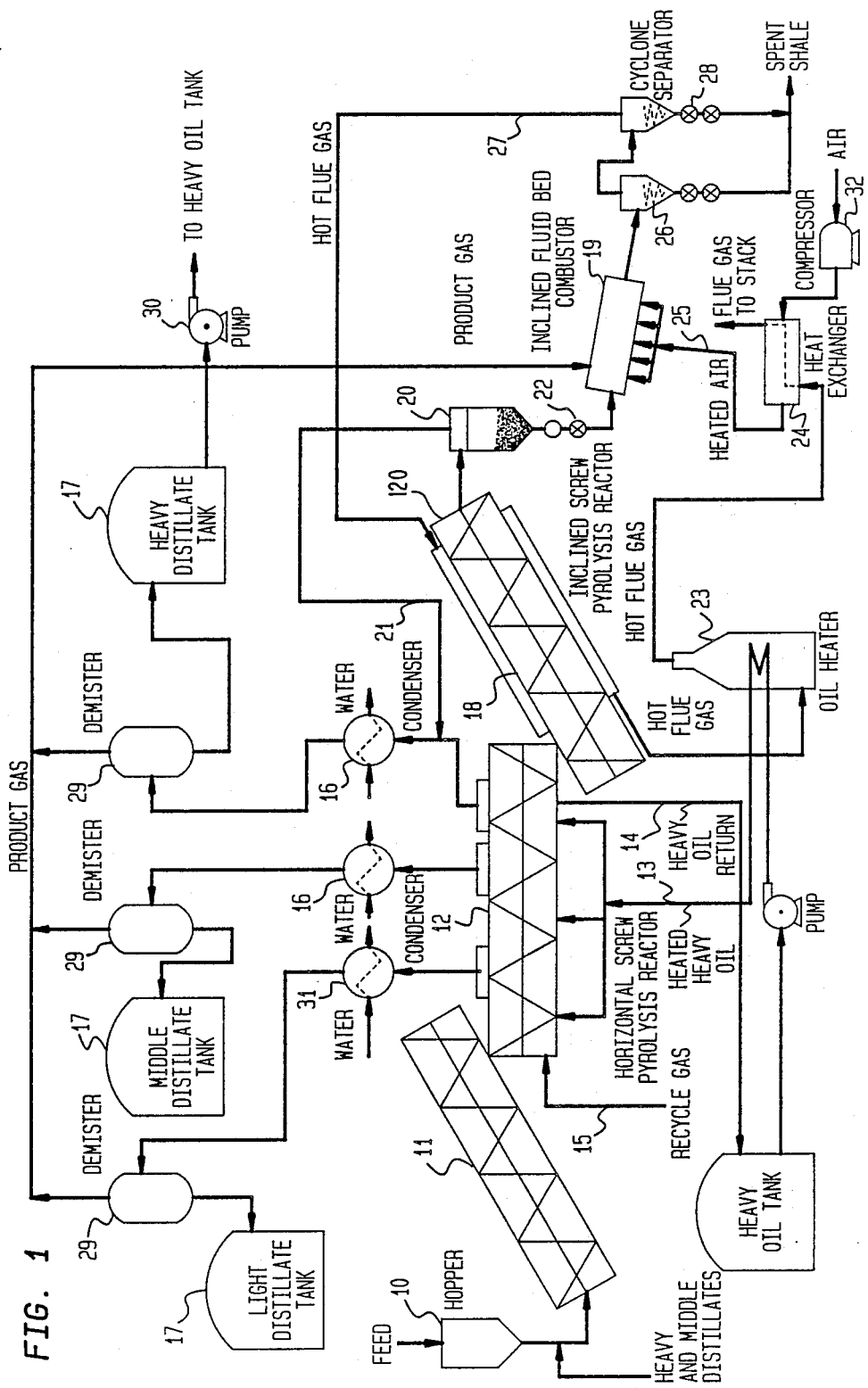
FIG. 1 shows a process flow diagram for the tar sand and oil shale process of the present invention.

The apparatus for effecting the tar sand and oil shale process of the present invention is shown in FIG. 1, which also shows the steps of the process.

Crushed and screened oil shale or tar sand is fed into the hopper (10), where it is mixed with heavy distillates (product oil). The solid feed is heated to about 180° F. by the heated product oil. In the case of tar sand, most of the bitumen is extracted by the recycled product oil. The oil shale in the hopper is soaked with the product oil and the absorbed product oil could extract the bitumen when the kerogen is pyrolyzed.

The mixture of solid and product oil is fed into the first section of the horizontal screw reactor (12) by the screw conveyor (11). The product oil not only extracts the bitumen but also weakens the stickiness of unconsolidated tar sand such as Asphalt Ridge tar sand so that it can be fed easily by the screw conveyor.

The HSPR consists of three separately controlled heating zones. The temperature of each zone is controlled by controlling the temperature and flow rate of recycled heavy oil. The range of temperature for each zone is given below.

First zone 450°~500° F.
Second zone 650°~750° F.
Third zone 725°~775° F.

The external heaters may be used in addition to the heated recycled heavy oil in order to maintain the required temperature for each of the three zones. Each zone is equipped with a heated recycle heavy oil inlet (13), external heater (14), recycle gas inlet (15), condenser (16), and condensate collection tank (17).

The oil and water vapors flowing from three zones are condensed in the condensers and collected in the condensate tanks. The heavy distillate and a part of the middle distillate are recycled to the feed hopper to soak the solid feed and to provide the oil seal for preventing the gas leakage. A part of the noncondensible product gas is recycled to each of three zones and the ISPR to sweep the vapor. The rest of the product gas flows into the IFBC and is burned with the retorted shale.

The rate of heavy oil flow from the HSPR is controlled to be constant by adjusting the middle and heavy distillates recycle rate. Net production rate of heavy oil from the HSPR can be also controlled by controlling the recycle oil rate and third heater temperature. The viscosity of heavy oil is controlled by heater temperatures.

The retorted solid material is separated from the heavy oil and fed into the ISPR (18). The heavy oil absorbed on solid material and unconverted organics in the solids are recovered by heating it with the hot gas produced from the IFBC (19) to about 950° F. when the solids pass through the ISPR.

The solids leaving the ISPR are collected in a cyclone (20), which serves as the feed hopper for the IFBC. The product gas and oil vapor produced in the ISPR and cyclone flow to the condenser (21) connected to the third zone of the HSPR. The cyclone is well insulated to minimize the heat loss and equipped with double valves (22) to prevent the combustion gas flow from the IFBC to the ISPR.

The ISPR is externally heated by the hot flue gas produced from the IFBC. The hot flue gas leaving the ISPR flows through the oil heater (23) to heat the heavy recycle oil. The hot flue gas leaving the oil heater flows through the heat exchanger (24) to heat the combustion air for the IFBC.

Hot retorted solid material and product gas are fed into the IFBC and burned by the heated air (25). The burned solids are discharged from the IFBC to the cyclone separator (26). The hot flue gas (27) is separated from solids in the cyclone and leaves the top of the cyclone separator. The burned solids leave the bottom of the cyclone separator (28) and are conveyed for disposal.

To remove sulfur gases from the hot flue gas, dry solvent such as limestone is added to the IFBC. As a result, the flue gas does not have to be treated by a separate system. The organic residue in the retorted solids and product gas provide enough heat required for the process. However, external fuel can be added to the IFBC if necessary.

The liquid handling system consists of condensers (16), oil collection tanks (17), demisters (29), oil pumps (30), and an oil heater (23). The condensers are equipped with the water cooled heat exchangers (31), as shown in FIG. 1. The gas handling system consists of compressors (32), a heat exchanger (24), and a product gas storage tank. FIG. 1 does not show the product gas storage tank blower. A simple gas blower is enough to handle the product gas since the process system is operated at low pressure (less than 5 psig).

Figure 2:
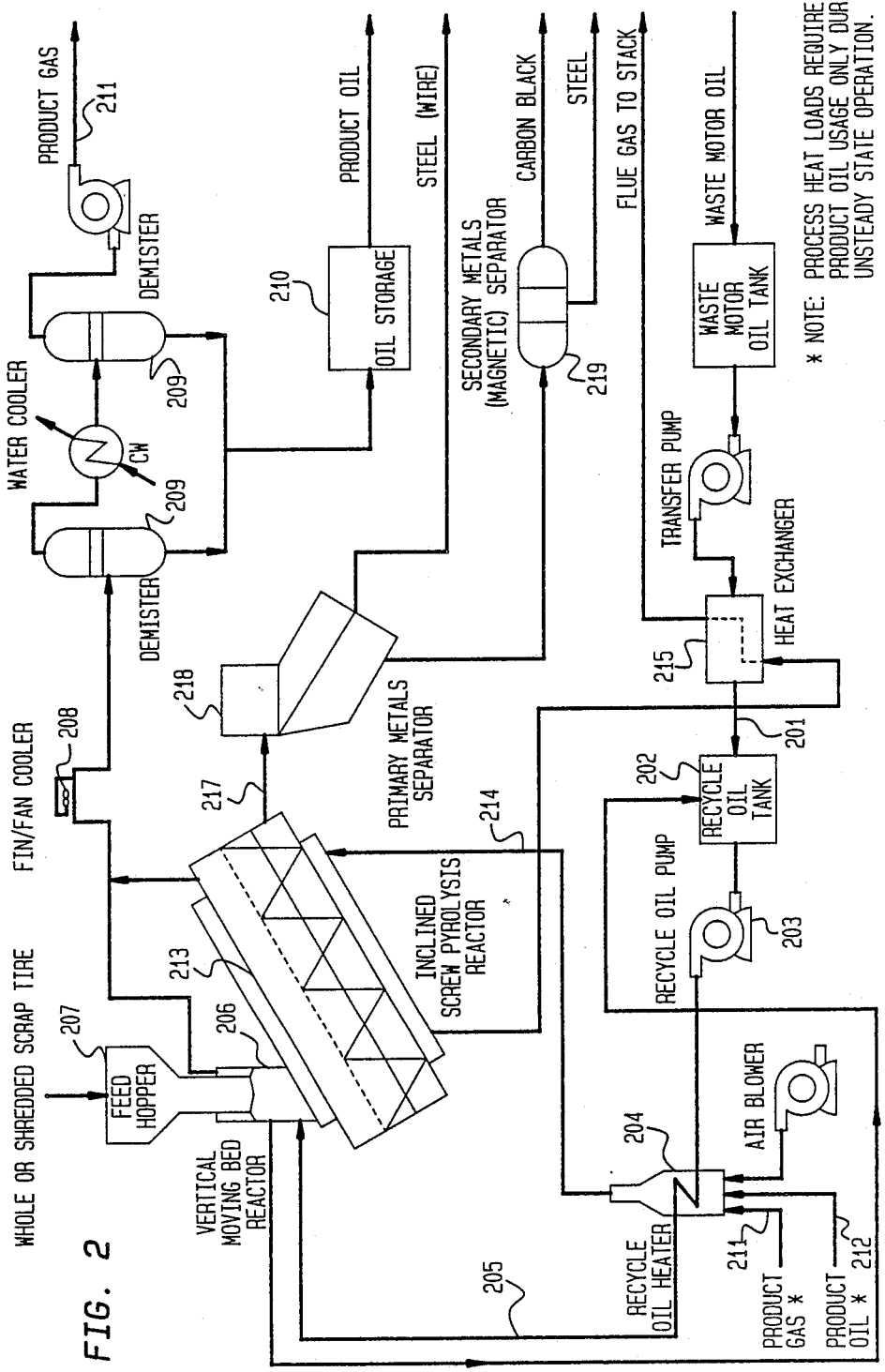
FIG. 2 shows a process flow diagram for the scrap tires and waste motor oil process of the present invention.

The apparatus for effecting the scrap tires and waste motor oil process of the present invention is shown in FIG. 2, which also shows the steps of the process.

The heated waste motor oil (201) is fed into the oil tank (202) and mixed with heavy product oil. The mixture of heavy product oil and waste motor oil is pumped by the oil pump (203) through an oil heater (204) and heated to about 900° F. (850° F.$\leq$T$\leq$950° F.). The heated oil mixture (205) is fed into the bottom of the moving-bed reactor (206) and flows through the reactor toward the top.

Whole or shredded scrap tires in the feed hopper (207) are fed into the top of the moving-bed reactor and move downward by gravity. The feed column extends into the oil to provide the seal for preventing the gas leakage. The scrap tires are heated and pyrolyzed by the heated oil when they are moving through the reactor (206). The flow rate of product oil and waste motor oil mixture is controlled to maintain the top oil temperature in the range of 500° to 650° F.

The oil and water vapors flowing from the top of the moving-bed through the fin/fan cooler (208) are condensed in the demisters (209) and collected in the condensate tank (210). A noncondensible gas (211) flows into the heater (204), and is burned to provide heat required for the process. The liquid oil product flows out the top of the moving-bed reactor (106) and is collected in the oil tank (202).

The product gas is a major fuel for the oil heater but a part of the product oil (212) can be burned in the heater if required. The final boiling point of the product oil (distillate) is controlled by controlling the recycle oil flow rate and temperature. The heavy liquid oil will be continuously decomposed into lighter oil when recycled.

The retorted solid material from the bottom of the vertical moving-bed reactor (206) is fed into the ISPR (213). The solid material is separated from the heavy oil when it moves through the ISPR (213). The ISPR is heated by the hot flue gas (1400° F.) which flows outside the reactor countercurrent to the solid material. The hot flue gas (214) is produced from the oil heater (204). The flow rate of hot flue gas is controlled to maintain the temperature of solid material leaving the inclined screw reactor in the range of 900° to 1100° F. The flue gas leaving the inclined screw reactor flows into the heat exchanger (215) to heat the waste motor oil, then to the stack, and is vented into the atmosphere.

The heavy oil absorbed on solid material and unconverted organics in the solids are recovered by heating it with the hot flue gas when the solids pass through the inclined screw reactor. The oil vapor (216) leaving the ISPR is condensed and collected in the oil tank (210). The solid materials (217) leaving the inclined screw reactor are collected in the wire separator (218) and pass through the magnetic separator (219), which separates the steel from the solid material.

Noncondensible product gas flows with oil vapor from the inclined screw reactor to the demisters. Product gas leaving the demisters is burned in the oil heater. Wires are separated in the wire separator which is equipped with double valves to prevent leakage of oil vapor and product gas from the inclined screw reactor.

Two separators (wire and small steel piece separators) are used to separate the steel materials from solid materials leaving the inclined screw reactor. After the steel is separated, the solid material contains mostly carbon black.

The following experiments were conducted with a two-inch diameter SPR system to provide a continuous retorting system for tar sand and oil shale. A four-inch diameter IFBC system was constructed to burn the retorted solid material.

The screw pyrolysis reactor systems consists of the following subsystems:
  horizontal screw pyrolysis reactor (HSPR)
  inclined screw pyrolysis reactor (ISPR)
  feeder
  heavy oil tank and pump
  reflux condensers and flasks
  solids collection tank The HSPR has a 1.5-inch diameter screw and a two-inch diameter casing, and is 10 feet long. It is equipped with three separately controlled heaters and three condensers and condensate collection pots.

The ISPR also has a 1.5-inch diameter screw with a two-inch diameter casing, and is about eight feet long. It is equipped with a heater and connected to a solids collection tank. Motors for the SPR's are run with compressed air. Oil vapor from the SPR is condensed with chilled water.

Figure 3:
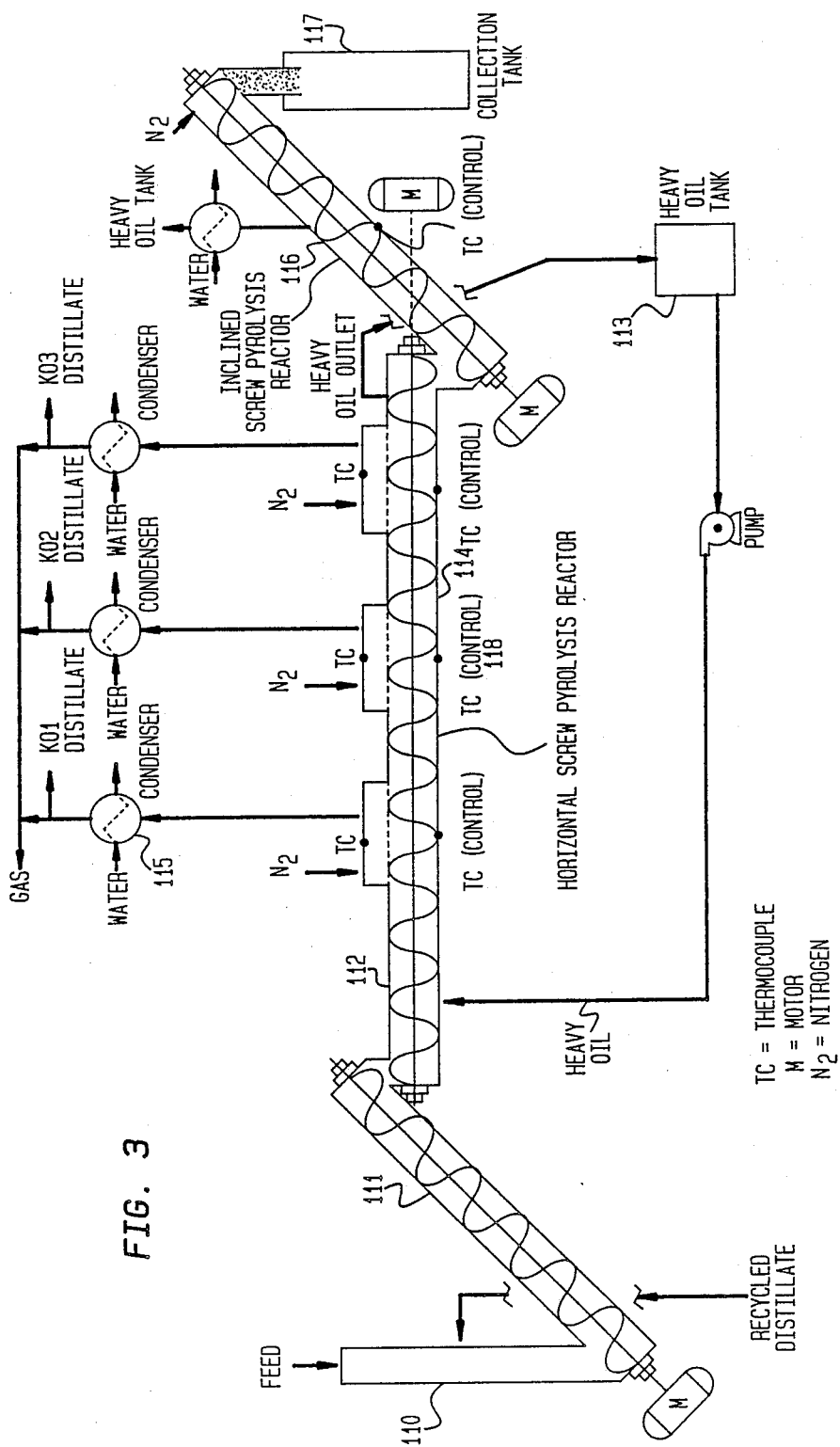
FIG. 3 shows a 2-inch process development unit of the present invention.

FIG. 3 shows an overall process flow diagram for the SPR system. Solids are fed into a feeder (110) and mixed with the recycled product oil. The feeder screw conveyor (111) feeds the mixture of solids and recycle product oil into the HSPR (112). The product oil produced from the middle and heavy distillate collection pots is recycled to the feeder (110). The recycled heavy oil is pumped from the heavy oil tank (113), and mixed with solids at the entrance of the HSPR (112). The mixture of solids and recycled oil is heated to a predetermined temperature by electric heaters (114). The oil vapors are collected in three oil vapor collection pots (not shown) and condensed when passed through reflux condensers (115). Nitrogen is used to sweep the oil vapor.

The heavy oil flows from the end of the HSPR (112) into the heavy oil tank (113). The retorted solid material is separated from the heavy oil and fed into the ISPR (116). The heavy oil absorbed on solid material and unconverted organics in the solids are recovered by heating with an electric heater to about 950° F. when the solids pass through the ISPR. The solids leaving the ISPR are collected in the collection tank (117).

The HSPR can be maintained at the isothermal condition by setting the same control temperature at the three heater controllers (118). Three different temperature zones can also be set for the HSPR by setting different control temperatures at each of the three heater controllers.

Asphalt Ridge tar sand was used for the tests to determine the temperature and residence time effects and a 48-hour steady-state test. Only one test was conducted with Sunnyside tar sand to obtain preliminary results and to provide oil samples for the initial evaluation of product oil characteristics. The bitumen content and Fischer assay analysis are given in Table 1.

Asphalt Ridge tar sand is an unconsolidated material, whereas Sunnyside tar sand is a consolidated material. In addition, the Fischer assay oil yield in terms of weight percent bitumen is greater (79.3% of bitumen) for the Asphalt Ridge tar sand than the Sunnyside tar sand (68.8% of bitumen) as shown in Table 1. Fischer assay analysis closely represents the conventional hot gas and combustion processes. Since the gas yield is about the same for both tar sands, the spent sand produced from the Sunnyside tar sand contains a larger amount of organic carbon residue (coke) than that from the Asphalt Ridge tar sand. The organic carbon residue in the spent sand is mainly produced from the pyrolysis of aromatic compounds. Therefore, it may be concluded that the Sunnyside tar sand has a greater concentration of aromatic compounds than Asphalt Ridge tar sand. It should be noted that the atomic ratio of hydrogen to carbon in the bitumen is approximately the same for both tar sands (Table 1). As a result, the Sunnyside tar sand is expected to produce more aromatic oil than the Asphalt Ridge tar sand.

Figure 4:
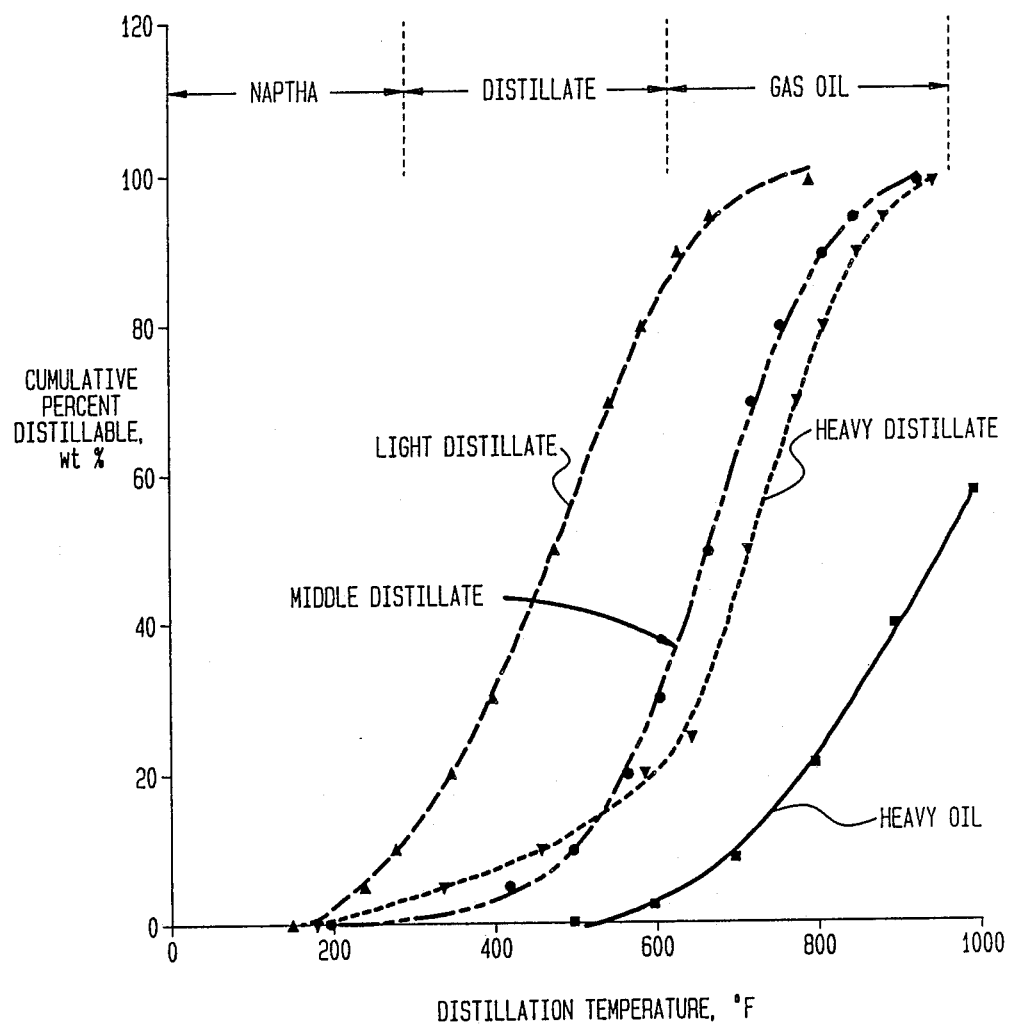
FIG. 4 shows gas production during Asphalt Ridge tar sand tests.

Eight tests were performed with Asphalt Ridge tar sand to determine the effects of pyrolysis temperature and solid residence time on the oil yield and product characteristics. The test period for these tests was approximately 12 hours. Steady-state with respect to the composition and rate of product gas was reached after about 4 hours of operation as shown in FIG. 4. Since the product gas closely represents the process condition, it was felt that a 12 hour test was adequate for parametric studies. However, it was recognized that a much longer test period is required for the product oil to reach a constant composition. A 48-hour test was conducted to determine the time required to achieve steady-state with respect to the product oils.

A summary of test conditions and oil yields is presented in Table 2. Detailed overall material and elemental balances for eight tests are summarized in Table 3. Overall material and elemental balances for the 48-hour test is presented in Table 4. The overall material balances varied between 96 and 101% (Table 3). Since it was difficult to completely empty the reactors, the major problem in obtaining good material balances involved spent sand which remained in the screw reactors. To minimize this error, both horizontal and inclined reactors were filled with sand at the beginning and at the end of each test. Hydrogen balances are greater than 100% mainly because of a small amount of water contained in the oil samples, which was discovered after all tests and sample analyses were completed.

Oil yields for the Asphalt Ridge tar sand tests are in the range of 80 to 89% of total organics. The oil yield increases with increasing pyrolysis temperature, to a maximum at 400° C., and then decreases with further increase in the pyrolysis temperature (Table 2). When the pyrolysis temperature increases to 430° C., the oil yield decreases significantly. The oil yield slightly increases as the residence increases from 30 to 50 minutes. Since the increases in the oil yield is negligible when the residence time increases from 40 to 50 minutes, the optimum pyrolysis temperature and residence time of solids are 400° C. and 40 minutes, respectively.

Figure 5:
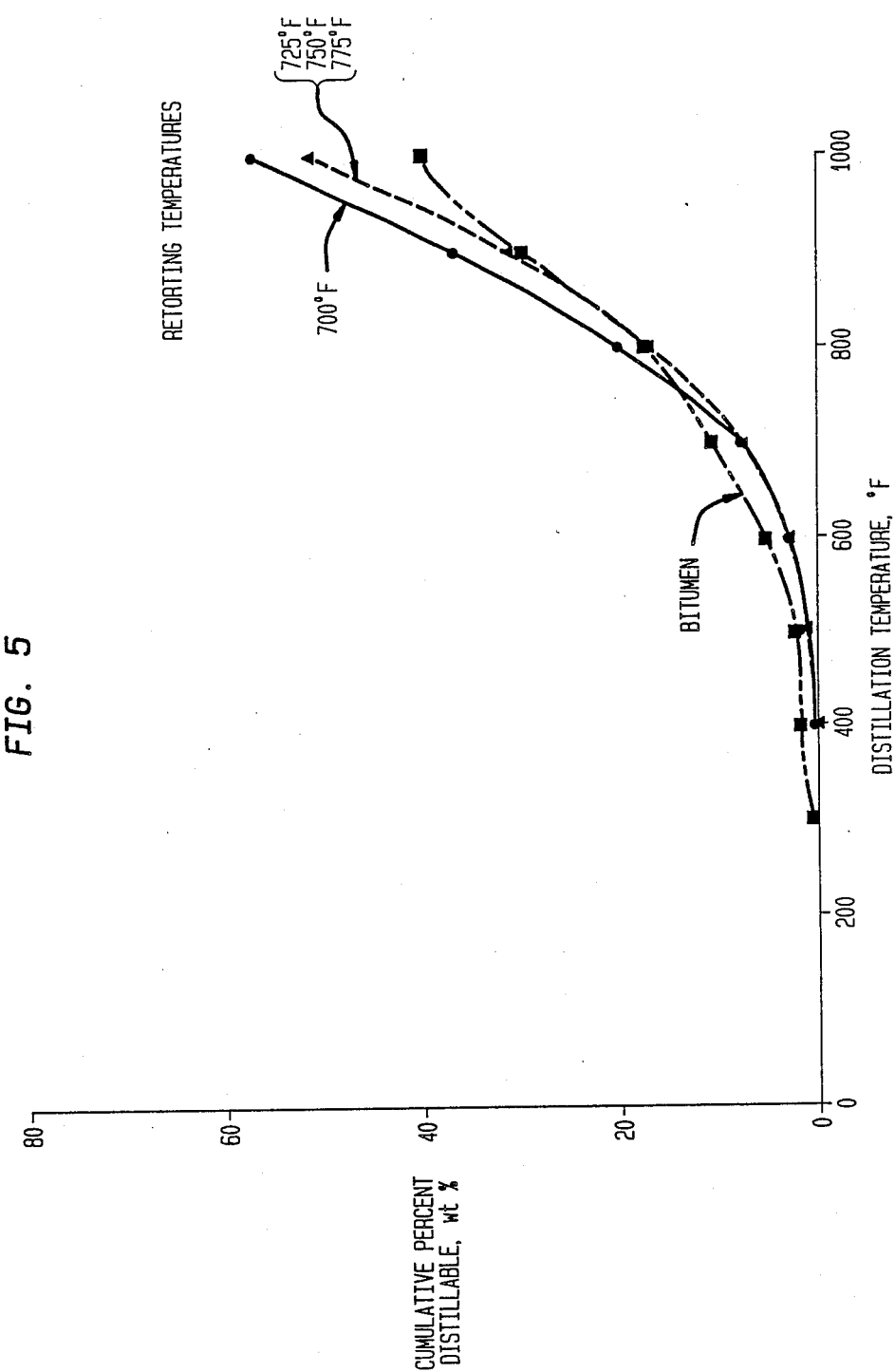
FIG. 5 shows the effects of retorting temperature and residence time on the product yields.

The product distribution as a weight percent of total organics is shown in FIG. 5 and also in Table 5 as a function of pyrolysis temperature. The distribution of organics produced from the Fischer assay analysis is also given in Table 5 for comparison. The product gas yield increases as the pyrolysis temperature increases. The residence time did not significantly affect the gas yield (Table 5). The coke yield closely follows the oil yield. A comparison of test data with the Fischer assay product distribution indicates that the gas yields are about the same at the 370° C. pyrolysis temperature but coke yield from the Fischer assay is much greater than the ROPE © process tests (Table 5). As a result, the ROPE © process produces greater oil yields even if the gas yield is higher than the Fischer assay.

The oil yield from the 48 hour test (SPR-59) is lower than that from the 12 hour test (SPR-55) at the same condition. This was caused mainly by plugging problems in the transition between the HSPR and ISPR which occurred after 24 hours. As a result, the coke and gas yields from SPR-59 are greater and the oil yield is lower than SPR-55. The 2-inch diameter PDU has been modified to reduce plugging problems.

Figure 6:
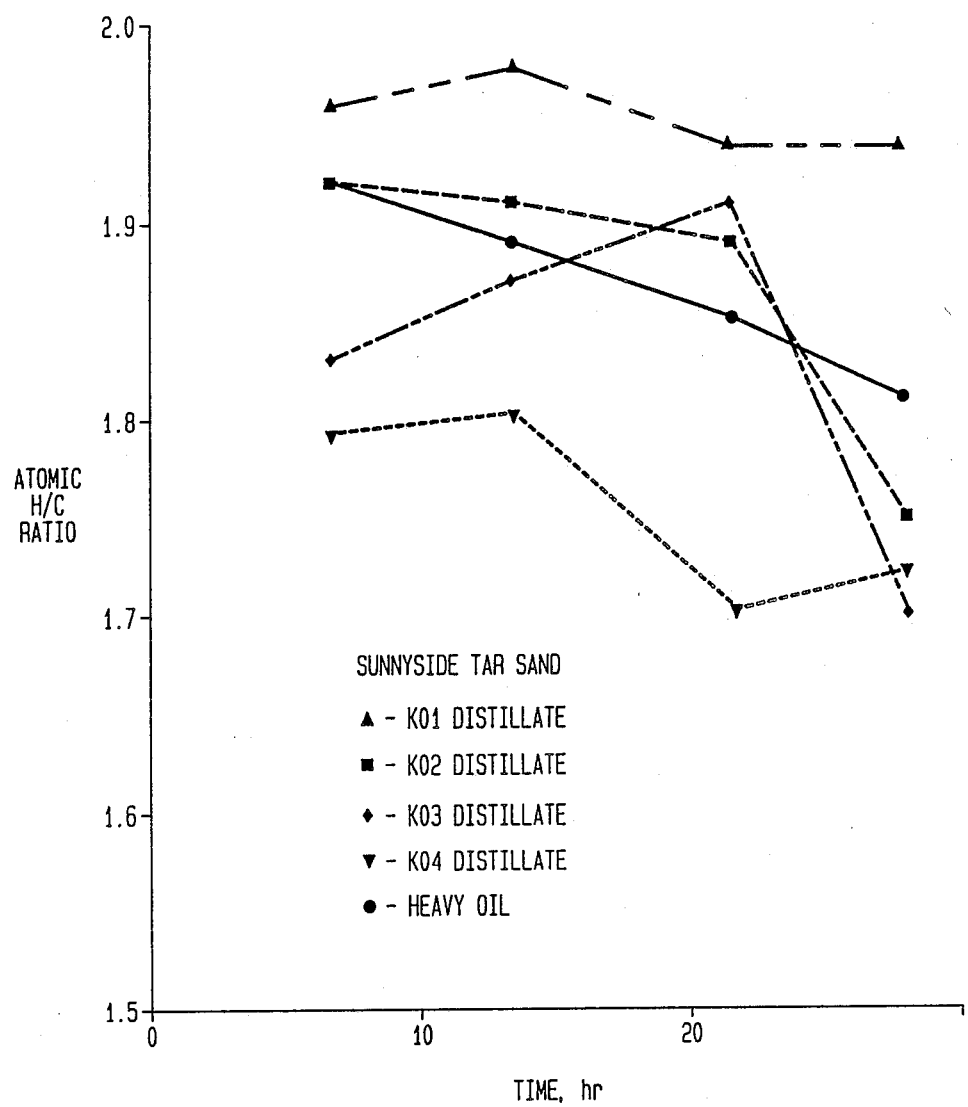
FIG. 6 shows the effect of retorting temperature on the product oil distribution.

When a 370° C. pyrolysis temperature was used, more than 90% of produced oil was a heavy oil as shown in FIG. 6. On the other hand, more than 90% of produced oil was a light oil distillate at the retorting's temperature of 400° C. Since the light oil is the desired oil product and the maximum oil yield was obtained at 400° C., the optimum retorting temperature and residence time of solids are 400° C. and 40 minutes, respectively as mentioned earlier.

Figure 7:
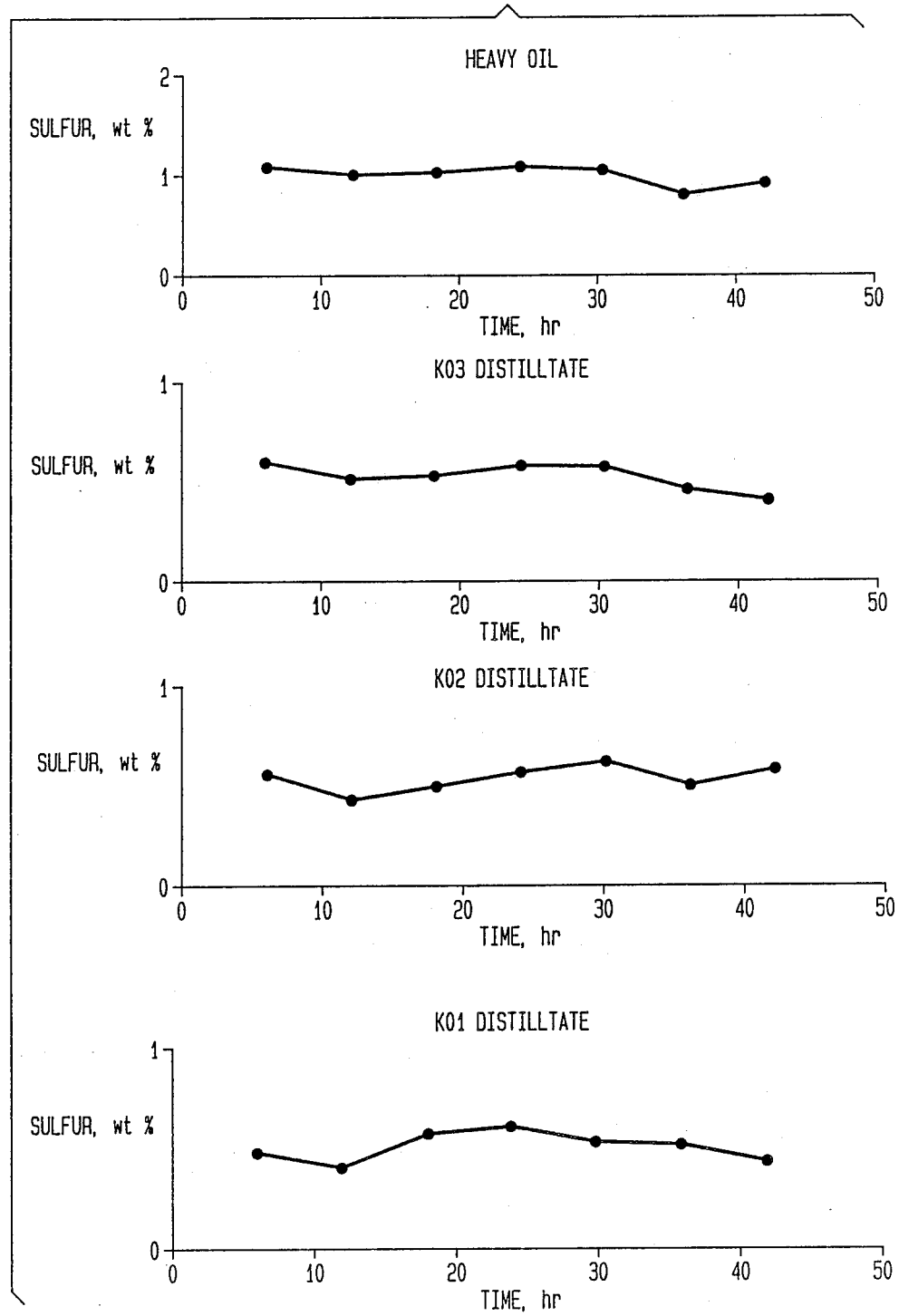
FIG. 7 shows the effect of retorting temperature on the product oil quality for Asphalt Ridge tar sand.

The atomic hydrogen to carbon ratio (H/C) is shown in FIG. 7 for the oil produced at the various retorting temperatures. The atomic H/C ratio for K01 product oil is independent of third zone retorting temperature as expected. However, the hydrogen to carbon ratios for K02 and K03 product oil are slightly lower at increased third zone retorting temperatures. Chemical and physical of bitumen and product oils from the SPR-59 test are given in Table 6. Product oils from other Asphalt Ridge tar sand tests have similar properties. Table 6 clearly shows that oil products from K01, K02, and K03 (main products) have much improved properties when compared with the native bitumen. The product oils have much lower nitrogen contents than the bitumen.

Figure 8:
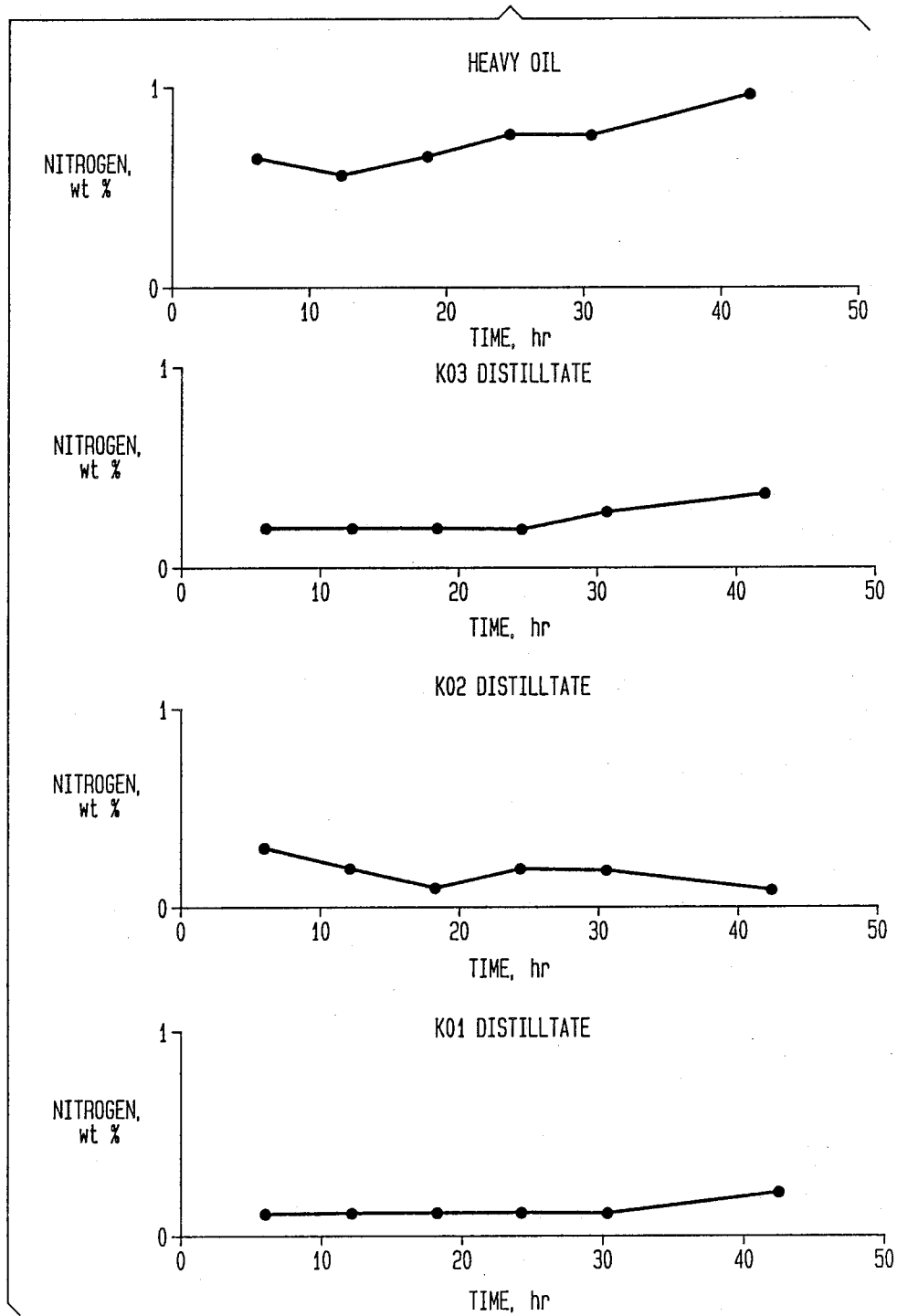
FIG. 8 shows a steady-state gas production.

The composition of product gases from the various tests is given in Table 7. The composition of Fischer assay product gas is also shown in Table 7 for comparison. The product gases from SPR-44 to SPR-59 have much lower methane concentration than Fischer assay gas. The product gas has a higher concentration of higher hydrocarbons ($C_4+$) than Fischer assay gas, which indicates that the condensing system needs to be improved. Higher retorting temperature produces more gas as shown in FIGS. 5 and 8.

Figure 9:
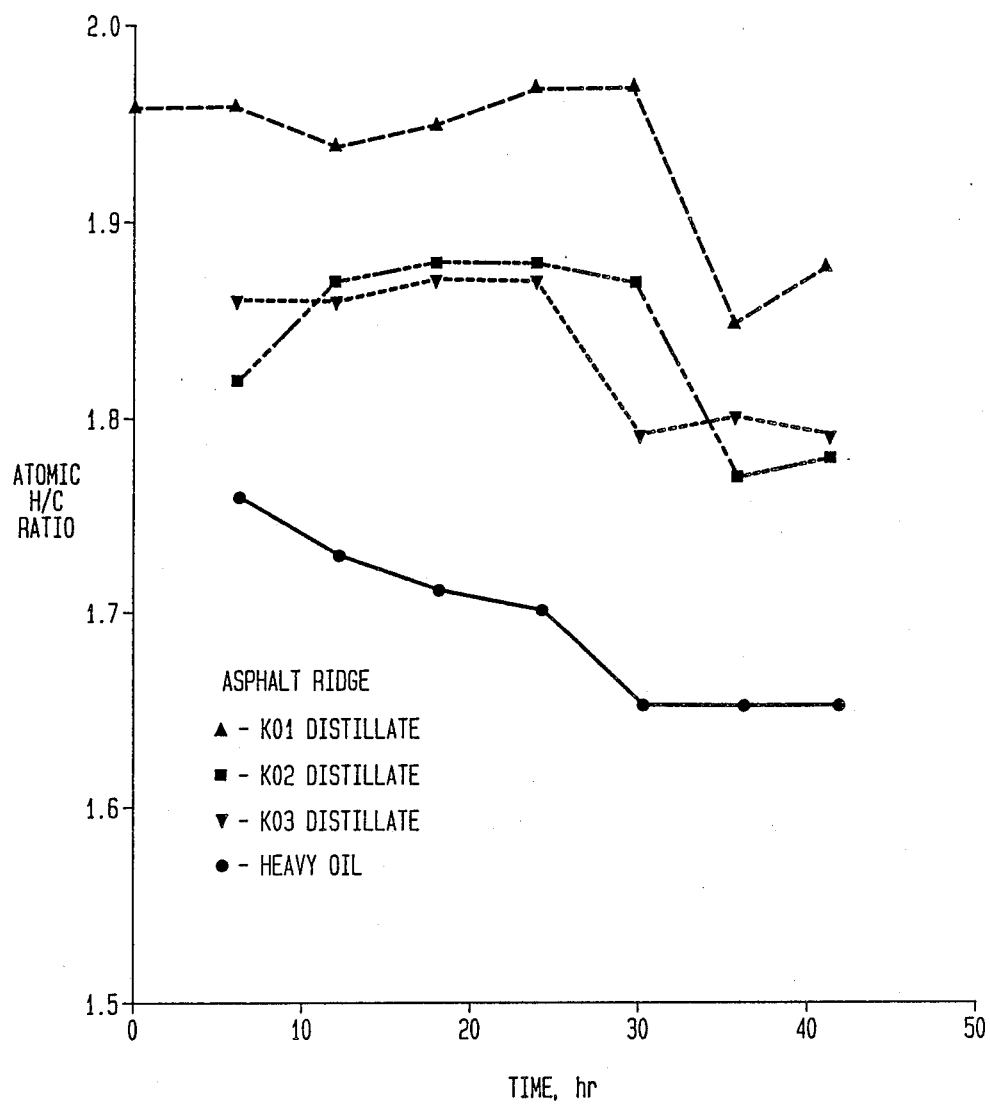
FIG. 9 shows product oil variations during Asphalt Ridge tar sand tests.
Figure 10:
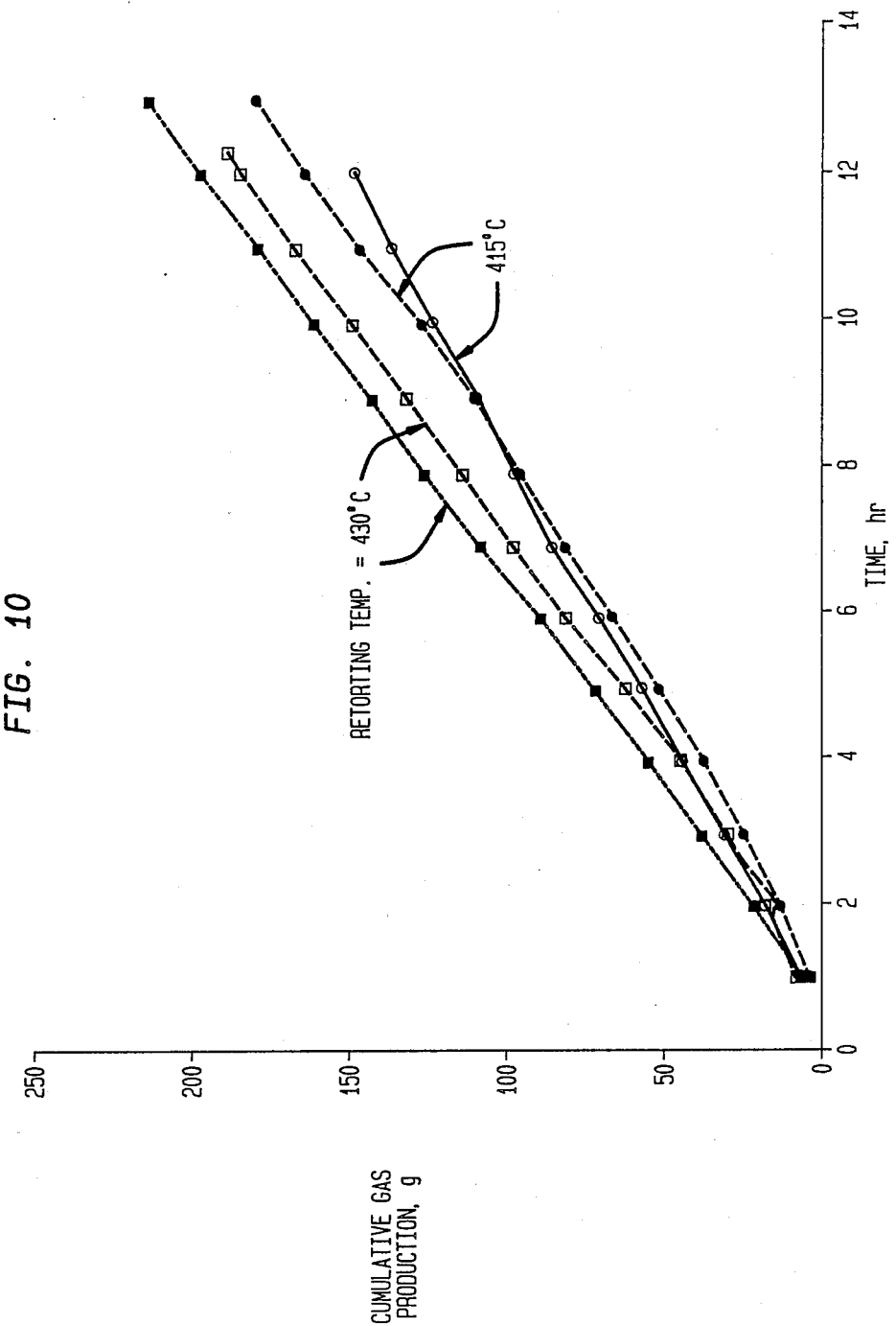
FIG. 10 shows the nitrogen content of product oils from Asphalt Ridge tar sand tests.
Figure 11:
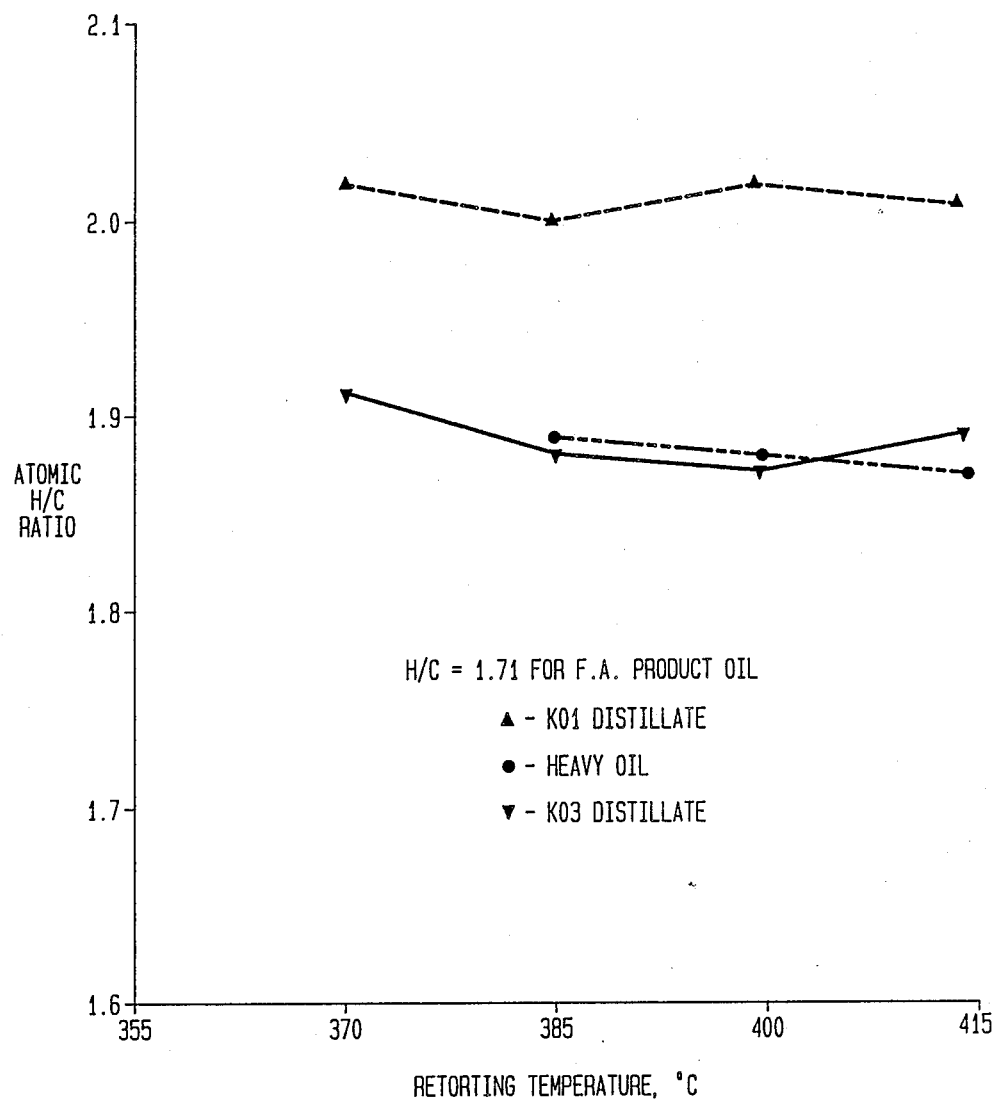
FIG. 11 shows the sulfur content of product oils from Asphalt Ridge tar sand tests.

To see the changes in the product oil with time, the atomic ratio of hydrogen to carbon is shown in FIG. 9 as a function of time. The heavy oil composition reaches steady-state after 30 hours. Also it appears that product oils from K01, K02, and K03 approach steady-state after 30 hours (FIG. 6). Although more tests need to be conducted to determine an exact time for steady-state with respect to product oil composition, it may be concluded that the time required for steady state is greater than 30 hours. FIGS. 10 and 11 show the nitrogen and sulfur contents of product oils as a function of operating time. The nitrogen content of heavy oil increases with time. The nitrogen contents of K01 and K03 products oils tends to increase with time. However, K02 product oil nitrogen content tends to decrease with time (FIG. 10). The sulfur content of product oils appear to be independent of operating time (FIG. 11).

The oils produced from K02 and K03 were recycled to the first heating section of the HSPR. FIG. 6 indicates that the oils from K02 and K03 may be more aromatic when the operating time increases beyond 30 hours. The atomic H/C ratio is lower for the oil containing a higher concentration of aromatic hydrocarbons.

The initial evaluation of product oils from Asphalt Ridge tar sand tests did not show a strong potential for producing an advanced fuel feedstock from the Asphalt Ridge tar sand. One 32-hour test was conducted with the Sunnyside tar sand in the 2-inch PDU to obtain preliminary data.

The overall material and elemental balances are given in Table 8. Poor material balances resulted from plugging problems experienced during the test. The oil yield (Table 2) was also lower than expected from Asphalt Ridge tar sand tests. However, the oil yield is greater than Fischer assay yield.

Product distribution given in Table 5 shows that the oil and gas yields are greater but coke yield is lower than the Fischer assay yield. As a result, more bitumen is recovered by the ROPE © process than the Fischer assay.

Figure 12:
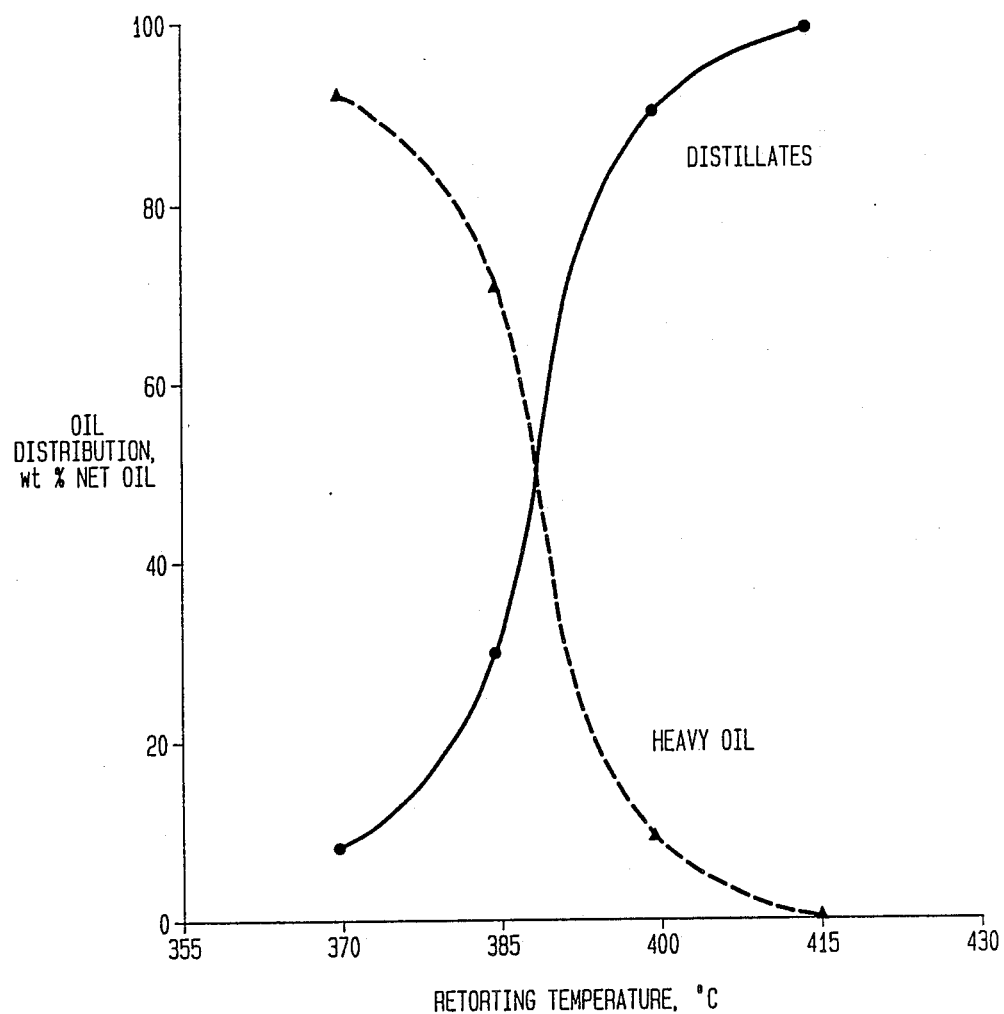
FIG. 12 shows the product oil variations during the Sunnyside tar sand test.

The atomic H/C ratio is shown in FIG. 12 for three distillates and heavy oil as a function of time. Except K01 product oil, none of the product oils reached steady-state when the test was completed. The composition of product gas is given in Table 9 with the Fischer assay product gas. The methane concentration is lower but concentrations of the higher hydrocarbon are greater than Fischer assay.

The use potential of the products produced using this process were evaluated to determine if they had market value. The approached used for this evaluation relies on determining the hydrocarbon type distribution in each sample and comparing these results with the hydrocarbon type distributions in conventional refinery products. To assist in this evaluation, GC/MS data was partitioned into groups that approximate distillation cuts normally utilized in a refinery. This was achieved by correlating the gas chromatographic retention time with the boiling points of normal alkanes in a fashion similar to that used for simulated distillation analyses. The distillation ranges selected for this evaluation are IBP-177° C. (IBP-350° F.) and 177°-371° C. (350°-700° F.) The IBP-177° C. (IBP-350° F.) distillate fraction represents a gasoline or gasoline blending fraction and the 177° to 371° C. (350°-700° F.) distillate fraction represents a middle distillate that could be used for diesel or aviation turbine fuels.

The products recovered from processing Asphalt Ridge and Sunnyside tar sands were used for this evaluation. These resources were selected because they are considered to represent different types of bitumens. The Asphalt Ridge tar sand is considered to be an aromatic bitumen. Processing of tar sands containing different types of bitumens is expected to yield products that have different compositions and different use potentials.

The processing experiments used to produce the products from the Asphalt Ridge tar sand were performed at temperatures ranging from 370° to 415° C. (700° to 780° F.). The details of the experimental conditions employed for these experiments are provided in Table 2 for experiments SPR-44 through SPR-47.

The hydrocarbon type distributions for the distillate fractions from all three of the knock out receivers are provided in Tables 10 through 12. Examination of these results indicates that this distillate range is composed primarily of alkanes. The presence of alkanes is not surprising since the Asphalt Ridge tar sand is considered to be an aliphatic bitumen. The presence of the large quantities of alkanes indicates that this fraction does not have direct use as a gasoline because of the low octane rating of normal alkanes. The alkanes in this distillate range do have potential as a feedstock for alkylation and reforming units to produce a blending stream for the manufacture of gasoline.

The hydrocarbon type distributions of the 177° to 371° C. distillate fractions from processing of Asphalt Ridge tar sand are provided in Tables 13 to 15. Examination of these results indicate that the products from knock out receivers 2 and 3 are predominantly composed of alkanes, while the products from knock out receiver 1 has high concentrations of alkylbenzenes. The products from receiver 1 have value as a cracker feedstock which would primarily produce benzene, toluene, and xylenes (BTX). These products from the cracking unit would be valuable as a BTX blending stream for the production of gasoline.

The products from receivers 2 and 3 are significantly higher in alkanes. The high concentration of alkanes and alkenes in these products implies that aviation turbine fuels derived from these products would probably not meet freeze point specifications required for a finished fuel, because normal alkanes have adverse affects on fuel freeze points. The high alkane and alkene content of the products does indicate that these products have use for the production of diesel fuels. Normal alkanes are required for maintaining the cetane rating of diesel fuels.

The processing experiments used to produce the products from Sunnyside tar sand were performed basically under the same conditions. The details of the experimental conditions are provided in Table 2 for experiments 64, 64A, 64B, and 64C.

The hydrocarbon type distributions for the distillate fractions for the products obtained from processing of Sunnyside tar sand are provided in Tables 16 through 23. Evaluation of the IBP-177° C. distillate fractions of products from the four knock out receivers (Tables 16 through 19) indicate that this material is composed primarily of alkanes and alkylbenzenes. This distillate fraction, like the same distillate fraction from processing of Asphalt Ridge tar sand, is not directly suited for use as a gasoline. The relatively higher content of alkyl benzenes in these products, as compared to the Asphalt Ridge tar sand products, makes these products more attractive for use as a blending stream for production of a gasoline. Additional processing, such as reforming, will be required, but these products do have economic potential for the production of gasoline.

Evaluation of the 177° to 371° C. distillate fractions from the products collected from the four receivers (Tables 20 through 23) indicate that the products from processing of Sunnyside tar sand contain higher concentrations of aromatic hydrocarbons than were observed in similar products from Asphalt Ridge tar sand. Alkanes are present in the Sunnyside tar sand products at significant concentrations. This distillate range does not have direct use potential as either a diesel fuel or aviation turbine fuel without additional processing. Aviation turbine fuels, such as high-density fuels and advanced endothermic fuels, could be produced from these products with proper processing.

Processing considerations would include dewaxing to remove the alkanes and hydrogenation to convert the aromatic hydrocarbons to naphthenes. The resulting naphthenes are valuable for the production of these specific aviation fuels because they are both naphthenic based.

Two different eastern oil shales (New Albany and AMAX, Pennsylvania oil shale) and Israeli oil shale were tested in the two-inch SPR system. The product yields from Fischer assay analyses and the process tests using the process of the present invention (ROPE © process) are given in Tables 24 and 25, respectively. A comparison of Tables 24 and 25 clearly indicates that the ROPE © process oil yields are much greater than Fischer assay yields for all three different oil shales. The increase in the oil yield was mainly due to the decrease in the carbon residue remaining in the spent shale. Consequently, it may be concluded from these test results that the process of the present invention has a greater potential to recover much more hydrocarbon from the oil shale than conventional processes.

The product oil compositions and gravities are given in Tables 26, 27, and 28 for three different type product oils. The compositions of product oil produced from New Albany and Israeli oil shale using a typical combustion retorting process are shown in Table 29 for comparison.

Comparing Tables 26, 27, and 28 with Table 29, it can be clearly seen that the product oil produced from the process of the present invention, the ROPE process, has much lower nitrogen and sulfur content than oil produced from the conventional process. The product oil from the ROPE process is lighter and has a higher H/C ratio.

The composition of the product gas produced from New Albany oil shale is compared with the Fischer assay product gas in Table 30. The product gas from the ROPE test has a similar composition to the Fischer assay gas except for the methane and hydrogen contents. The composition indicates that the process of the present invention produces less methane but more hydrogen than the conventional process. Higher hydrocarbon content is greater for the ROPE test, indicating that the vapor condensing system needs to be improved.

It can be seen from the above that the process of the present invention significantly improves the yield and quality of oil recovered and requires much less process heat than the conventional processes.

Figure 13:
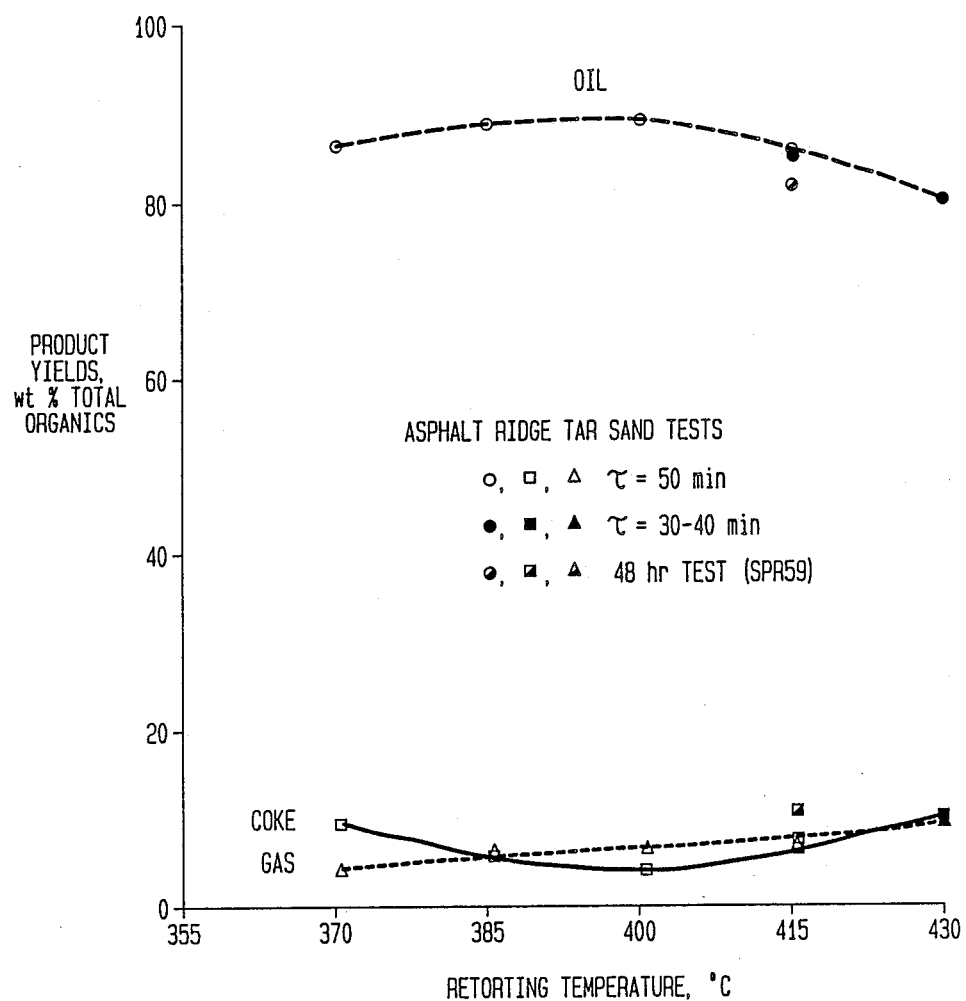
FIG. 13 is a detailed drawing of the IFBC.

A 4.5-inch diameter IFBC was constructed. The details of this IFBC are shown in FIG. 13.

Figure 14:
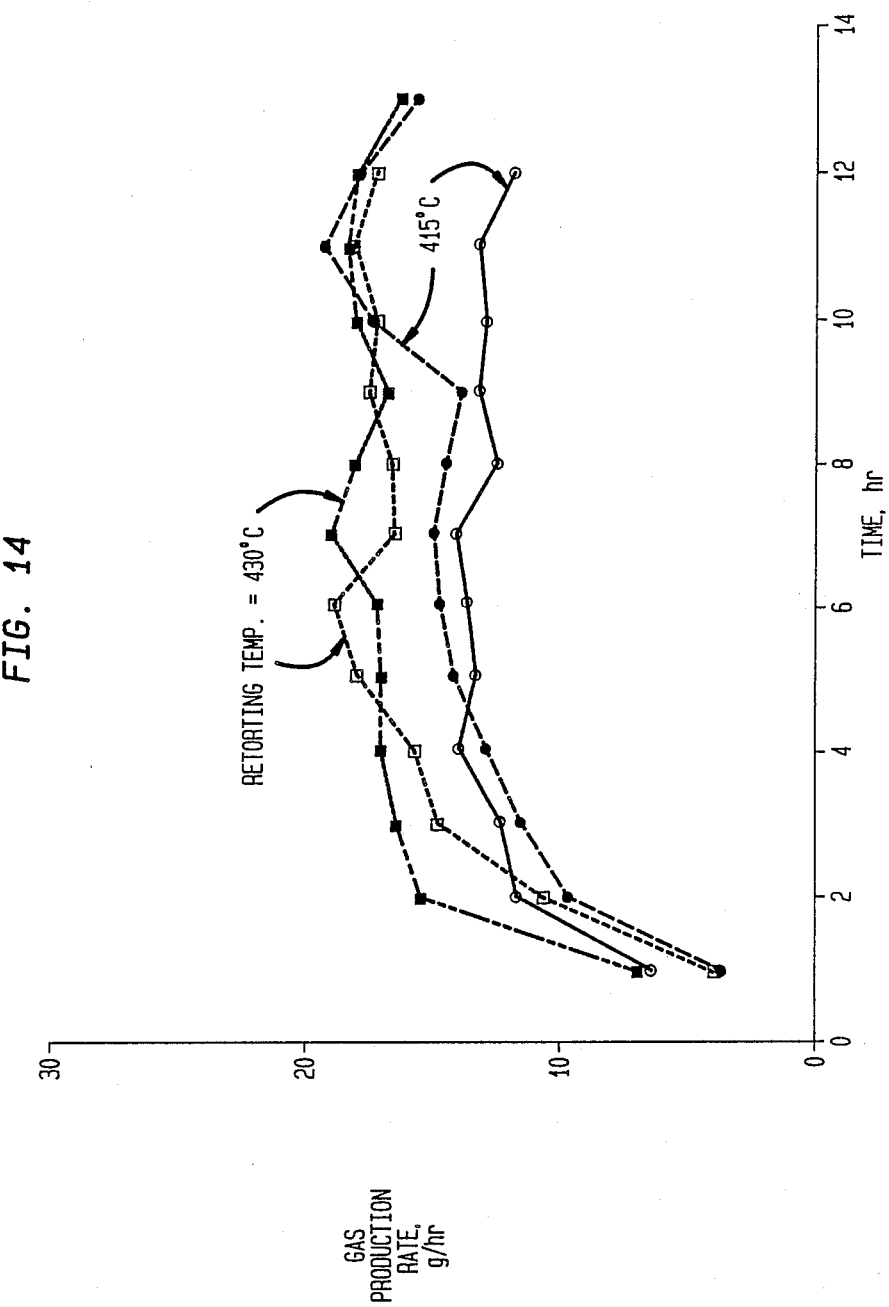
FIG. 14 is a description of the combustion of eastern oil shale.

Material produced from the two-inch diameter SPR was successfully burned in the 4.5-inch IFBC. In addition, western and eastern oil shales were burned with air. Table 31 shows the results of the combustion tests. More than 95% of the organic carbon contained in the oil shale was burned, as shown in Table 31. The temperature profile inside the IFBC is shown in FIG. 14 as a function of bed length. The bed temperature profile was easily changed by changing the flow rate and residence time of solids. The maximum combustion temperature was easily maintained at lower than 1500° F. to avoid formation of $NO_x$ during combustion.

The initial combustion results confirm that the retorted solid material and product gas from the pyrolysis process can easily be burned without any major operating difficulties.

The following advantages are obtained with the process according to the present invention, as compared with currently available processes:
 use of on-shelf equipment items
 mechanical simplicity
 operational simplicity and low pressure operation
 both oil shale and tar sand can be processed with the same reactor system
 high energy efficiency results from the recovery of residual carbon
 much greater yield of oil
 much improved oil quality A 6-inch diameter batch retort was loaded with the shredded scrap tires and SAE 50 nondetergent lubricating oil which has the initial boiling point greater than 800° F. The mixture of tire and heavy oil was heated to about 650° F. to simulate the first step of the process of the present invention. The oil vapor was condensed by chilled water when it passed through the reflux condenser. When the oil vapor stopped, the heavy oil was drained; then the residue in the retort was heated to 900° F. to complete retorting and to recover the heavy oil (second retorting step). Nitrogen was used to sweep the oil vapor.

Product yields vs. wt % of scrap tires are shown in Table 32.

The composition of the product gas is shown in Table 33.

A rectangular batch retort was constructed to pyrolyze a whole scrap tire. A 13-inch diameter steel belted scrap tire was loaded in the batch retort with SAE 50 nondetergent lubricating oil. The scrap tire was heated to 670° F. (first retorting step) and maintained at 670° F. until the oil vapor stopped. The oil vapor was condensed by chilled water and collected in the flask. When the oil vapor stopped, the heavy oil was drained; then the residue in the retort was heated at 900° F. (second retorting step).

Tables 34 and 35 show product yields and product gas composition, respectively.

Shredded scrap tires were loaded in the rectangular retort with waste motor oil from trucks. The weight ratio of waste motor oil to shredded scrap tires was 5.28. The experimental procedure was the same as the whole scrap tire test described above. The results are shown in Tables 36 and 37.

Product yields from waste motor oil pyrolysis have been estimated from Tables 32-36 and are presented in Table 38.

To test the technical feasibility for processing shredded scrap tires with product oil recycling, shredded tires were loaded in the rectangular batch retort with product oil (light oil) produced from previous tests. The weight ratio of product oil to shredded scrap tires was 1.85. The mixture was heated to 700° F. The temperature was held at 700° F. until no oil vapor was produced. Results are presented in Tables 39 and 40.

The results of elemental analyses of product oils from scrap tire experiments are given in Table 41.

The product oil produced from whole scrap tires has a slightly higher hydrogen to carbon atomic ratio but lower sulfur content. It should be mentioned that the scrap tires used in experiment 1 were different from experiments 3 and 4. A whole scrap tire used in experiment 2 was also different from other experiments. Scrap tires used in experiments 3 and 4 were the same. The API gravity of the product oil was in the range of 28 to 32.

As shown in Table 42, the product oil from shredded tires contain noticeably higher concentrations of alkylbenzenes. This indicates that these products are useful as either an unleaded gasoline or as a source for BTX (benzene, toluene, xylenes) to increase the octane number of gasoline.

Table 43 provides the distribution of the alkylbenzenes by the number of carbon atoms in the alkyl substituents. In addition to the relatively high concentration of the BTX alkylbenzenes, the product oil contains relatively high concentrations of the higher alkyl substituted members of the series. The higher alkyl substituted homologs can be catalytically cracked to yield the BTX fraction and increase the economic potential of the product oil.

The combined GC/MS results were divided into distillate ranges that correspond to a gasoline (IBP-400° F.) and a diesel (400°-700° F.). The results of the hydrocarbon group type analysis of the gasoline fractions are provided in Table 44. The alkylbenzene content of these products is comparable with that in commercial gasoline (Table 44). The yield of the gasoline range is approximately 66% of the product oil.

The results of the hydrocarbon group type analysis of the diesel fractions are presented in Table 45.

Carbon black mineral material recovered from retorted passenger car tires contains additives that retard oxidation. If these additives survive the retorting process they could provide similar effects in reducing oxidation or embrittlement of the asphalt binder in bituminous mixtures.

Complex dynamic rheological properties were obtained at 140° and 77° F. on unmodified and modified Venezuelan AC-10 viscosity graded asphalts. The modified asphalts were prepared by dispersing 10 and 15 wt % carbon black mineral material recovered from shredded scrap tire pyrolysis (experiment 1) into the molten asphalt (302° F.) by agitation supplied by a mechanical point shaker. At 15% addition, the viscoelastic moduli measured at 140° F. showed an asphalt stiffening effect at low rates of shear and improved flow properties at high rates of shear. Both effects are important to pavement performance properties. The increased viscosity from 890 to 1710 poise at lower rates of shear increases the ability of a pavement to bear greater loads without deforming and the increased flow characteristics at high rates of shear relieves induced stresses in the pavement at a faster rate. The latter showed reduced stress and thermal induced crack formation.

The effects of 10% carbon black mineral modification following a standard laboratory aging test (ASTM D-2872) were determined by rheological measurements at 140° and 77° F. At 140° F., similar data reported above were also observed for the laboratory aged asphalts. Viscosity values for the control and 10% modified asphalt at low rates of shear were $1.0 \times 10^4$ and $1.6 \times 10^4$ poise, respectively, and 5050 and 6230 poise at high rates of shear. Again, there was improved flow behavior at high rates of shear for the modified asphalt. However, the most striking difference between the unmodified and modified was the elastic profile of the modified asphalt. The data points over the entire 0.1 to 100 rad/sec rate of shear generated a smooth curve whereas the unmodified data plots were more erratic. This might imply that the polar molecules formed on aging interacted with the solid mineral matter to cause more uniform asphalt-mineral molecular interactions than between asphalt-asphalt molecular interactions. This is surprising since one would expect the mineral matter to be a foreign substance and disrupt molecular interactions.

At 77° F., the viscoelastic data supported the same trends observed at 140° F. In summary, the modification of Venezuelan asphalt with carbon black mineral matter recovered from shredded scrap tire pyrolysis (experiment 1) imparts desired effects in unaged and laboratory aged asphalt in terms of increased stiffness of the asphalt binder, improved flow characteristics at high rates of shear and for unknown reasons improved molecular interactions.

The process of the present invention provides a number of advantages in dealing with feeds such as tar sands, oil shale, waste oil, and scrap tires. These feeds can be readily processed according to the present invention in the screw pyrolysis reactor system which accommodates a two-step pyrolysis process.

Distribution of the products produced by the present invention indicate that oil yields obtained from the SPR tests are much greater than those from the conventional pyrolysis processes. Higher oil yields resulted from lower gas yields, and lower residual carbon remained in the spent sand. The oil yield slightly increased with the increase in the first step pyrolysis temperature of 700° to 750° F.

The ratio of heavy oil to light oil product is greatly dependent upon the first step pyrolysis temperature, and increase with the decrease in the reaction temperature.

Product gases from the SPR tests contain much less hydrogen and methane gases than the Fischer assay gas. Recycling light oil product further reduces the hydrogen and methane contents in the product gas.

The products of the present invention are significantly upgraded as compared to the native bitumen or scrap tires. The products are completely distillable below 900° F., the H/C atomic ratio is increased from 1.71 to 1.96, and the heteroatom concentration is significantly decreased.

The products from the recycle oil process are suitable for production of a primary blending stock for the production of diesel fuel.

The preliminary results obtained from the preceding indicated that oil yields from the process according to the present invention are much greater than with conventional pyrolysis processes. The oil yields obtained from the preliminary tests are greater than the Fischer assay yield, which represents the conventional pyrolysis process.

As compared with conventional recovery processes, the process of the present invention presents many advantages. The apparatus can be assembled from on-shelf equipment items which are mechanically quite simple. The process itself is relatively simple, and can be run at low pressures. For scrap tires, either whole or shredded tires can be used; use of whole scrap tires lowers the operating costs. The lower heat requirement of the process results in a greater energy efficiency. The product oil is of a higher quality than that resulting from prior art processes, and can be used as feedstock for gasoline and diesel fuels.

The foregoing description of the specific embodiments will so fully reveal the general nature of the invention that others can, by applying current knowledge, readily modify and/or adapt for various applications such specific embodiments without departing from the generic concept, and therefore, such adaptations and modifications are intended to be comprehended within the meaning and range of equivalents of the disclosed embodiments. It is to be understood that the phraseology or terminology employed herein is for the purpose of description and not of limitation.

TABLE 1

| Fischer Assay Analysis of Two Utah Tar Sands | | |
|---|---|---|
| Properties | Asphalt Ridge[a] | Sunnyside |
| Bitumen, wt. % of tar sand | 13.5 | 10.9 |
| Oil, wt. % of tar sand | 10.7 | 7.5 |
| wt. % of bitumen | 79.3 | 68.8 |
| gal/ton | 27.8 | 19.1 |
| Water, wt. % of tar sand | 0.3 | 0.2 |
| Spent sand, wt. % of tar sand | 88.4 | 91.8 |
| Gas and loss, wt. % of tar sand | 0.6 | 0.5 |
| Atomic H/C ratio (bitumen) | 1.6 | 1.6 |

[a]Average of three material balance Fischer assays

TABLE 2
Summary of Test Conditions and Oil Yields
(Asphalt Ridge Tar Sand)

| SPR Test No. | 47 | 45 | 44 | 46 | 55 | 56 | 57 | 58 | 59[a] | 64[c] |
|---|---|---|---|---|---|---|---|---|---|---|
| Horizontal SPR[b] | | | | | | | | | | |
| Third zone temp., °C. | 370 | 385 | 400 | 415 | 415 | 415 | 430 | 430 | 415 | 393 |
| Residence time, min | 50 | 50 | 50 | 50 | 40 | 30 | 40 | 30 | 40 | 40 |
| Oil Yield | | | | | | | | | | |
| Gallons/ton | 29.6 | 32.0 | 34.3 | 33.0 | 30.4 | 31.2 | 32.7 | 30.0 | 30.1 | 22.7 |
| wt. % of total organics | 86.6 | 88.9 | 89.4 | 86.1 | 85.7 | 85.0 | 80.8 | 80.0 | 82.1 | 76.7 |
| % Fischer assay (volume) | 106 | 115 | 123 | 118 | 109 | 112 | 117 | 107 | 108 | 119 |

[a]Extended steady-state experiment
[b]First and second zone temperatures are 260° and 370° C.
[c]Sunnyside tar sand test

TABLE 3
Summary of Material and Elemental Balances (% Recovery)

| SPR Test No. | Material | Carbon | Hydrogen |
|---|---|---|---|
| Asphalt Ridge | | | |
| 47 | 98.1 | 100.9 | 101.7 |
| 45 | 96.8 | 100.4 | 102.0 |
| 44 | 100.1 | 100.0 | 102.1 |
| 46 | 93.3 | 101.2 | 103.6 |
| 55 | 101.2 | 101.1 | 101.6 |
| 56 | 98.4 | 101.3 | 102.3 |
| 57 | 96.1 | 100.4 | 102.0 |
| 58 | 101.2 | 100.5 | 101.2 |
| 59 | 100.0 | 101.3 | 102.6 |
| Sunnyside | | | |
| 64 | 96.5 | 96.9 | 94.9 |

TABLE 4
Overall Material and Elemental Balances for Extended Steady-State Asphalt Ridge Tar Sand Test (SPR-59)

| | Material | Carbon | Hydrogen | Nitrogen | Sulfur |
|---|---|---|---|---|---|
| IN | | | | | |
| Tar sand | | | | | |
| bitumen | 8,100 | 6,950 | 932 | 89 | 32 |
| sand | 51,420 | | | 70 | 231 |
| connate water | 480 | | 53 | | |
| Heavy oil | 14,460 | 12,479 | 1,770 | 55 | 158 |
| Product oil | | | | | |
| KO1 | 5,921 | 5,068 | 811 | 8 | 29 |
| KO2 | 8,672 | 7,467 | 1,136 | 24 | 46 |
| Total in, grams | 89,053 | 31,964 | 4,702 | 246 | 496 |
| OUT | | | | | |
| Spent sand | 52,228 | 951 | 65 | 91 | 206 |
| Product oil | | | | | |
| KO1 | 8,637 | 7,393 | 1,183 | 12 | 43 |
| KO2 | 6,168 | 5,304 | 814 | 15 | 33 |
| KO3 | 4,993 | 4,294 | 654 | 18 | 27 |
| Heavy oil | 16,274 | 14,020 | 1,979 | 107 | 168 |
| Product water | 166 | | 18 | | |
| Product gas | 613 | 428 | 111 | | 47 |
| Total out, grams | 89,079 | 32,390 | 4,824 | 243 | 524 |
| % Recovery | 100 | 101 | 103 | 99 | 106 |

KO = Knockout pot

TABLE 5
Distribution of Organic Products (wt. % of Total Organics)

| Test No. | Oil | Gas | Coke |
|---|---|---|---|
| Asphalt Ridge | | | |
| SPR- 47 | 86.6 | 4.2 | 9.2 |
| 45 | 88.9 | 5.6 | 5.5 |
| 44 | 89.4 | 6.6 | 4.0 |
| 46 | 86.1 | 7.6 | 6.3 |
| 55 | 85.7 | 6.8 | 7.5 |
| 56 | 85.0 | 7.6 | 7.4 |
| 57 | 80.8 | 10.0 | 9.2 |
| 58 | 80.0 | 8.8 | 11.2 |
| 59 | 82.1 | 7.2 | 10.7 |
| MBFA[a] | 76.9 | 4.3 | 18.8 |
| Sunnyside | | | |
| SPR- 64 | 76.7 | 11.1 | 12.2 |
| MBFA[a] | 68.2 | 4.9 | 26.9 |

[a]Material balance Fischer assay

TABLE 6
Chemical and Physical Properties of Initial Asphalt Ridge Bitumen and Product Oils (SPR-59)

| Properties | Bitumen | KO1 Distillate | KO2 Distillate | KO3 Distillate | Heavy Oil |
|---|---|---|---|---|---|
| Elemental Analysis, wt. % | | | | | |
| Carbon | 85.8 | 85.6 | 86.0 | 86.0 | 86.2 |
| Hydrogen | 11.5 | 13.7 | 13.2 | 13.1 | 12.2 |
| Nitrogen | 1.1 | 0.1 | 0.2 | 0.4 | 0.7 |
| Sulfur | 0.4 | 0.5 | 0.5 | 0.5 | 1.0 |

TABLE 6-continued

Chemical and Physical Properties of Initial Asphalt Ridge Bitumen and Product Oils (SPR-59)

| Properties | Bitumen | KO1 Distillate | KO2 Distillate | KO3 Distillate | Heavy Oil |
|---|---|---|---|---|---|
| H/C Ratio | 1.61 | 1.92 | 1.84 | 1.83 | 1.69 |
| API Gravity | 10–12 | 39.0 | 28.5 | 27.7 | 13.3 |
| Specific Gravity (15.6° C.) | 1.0–0.986 | 0.8299 | 0.8844 | 0.8887 | 0.9770 |
| Distillation Data, wt. % | | | | | |
| 93.3–315.6° C. | 5.2 | 83.3 | 27.5 | 21.6 | 2.4 |
| 315.6–537.8° C. | 34.7 | 16.7 | 72.5 | 78.4 | 54.7 |
| >537.8° C. | 60.1 | — | — | — | 42.9 |

TABLE 7

Product Gas Composition (Dry Basis) from Asphalt Ridge Tar Sand Tests

| SPR Test No. | 47 | 45 | 44 | 46 | 55 | 56 | 57 | 58 | 59 | MBFA |
|---|---|---|---|---|---|---|---|---|---|---|
| Gas Components (vol. %) | | | | | | | | | | |
| $H_2$ | 26.8 | 25.9 | 27.2 | 23.3 | 30.4 | 29.3 | 27.6 | 29.5 | 24.7 | 22.0 |
| CO | 1.3 | 1.4 | 1.5 | 2.2 | 1.7 | 1.5 | 1.6 | 1.5 | 1.9 | 2.6 |
| $CO_2$ | 2.7 | 3.8 | 7.8 | 3.0 | 2.6 | 2.0 | 1.9 | 1.7 | 2.7 | 4.1 |
| $CH_4$ | 33.4 | 29.7 | 23.9 | 30.6 | 23.8 | 24.7 | 26.4 | 26.7 | 26.8 | 40.6 |
| $C_2=$ | 2.2 | 2.4 | 1.7 | 2.3 | 2.3 | 3.5 | 2.5 | 2.3 | 3.4 | 2.9 |
| $C_2$ | 8.9 | 9.2 | 7.5 | 9.1 | 8.0 | 8.5 | 8.5 | 8.3 | 8.2 | 9.4 |
| $C_3=$ | 3.9 | 4.2 | 3.6 | 4.5 | 4.8 | 5.5 | 4.9 | 4.5 | 5.2 | 4.2 |
| $C_3$ | 6.2 | 6.6 | 6.0 | 7.4 | 7.5 | 7.5 | 7.8 | 7.4 | 7.5 | 5.7 |
| $C_4$ | 7.3 | 8.0 | 8.1 | 8.6 | 10.0 | 9.9 | 10.0 | 9.3 | 9.2 | 3.9 |
| $C_5$ | 3.3 | 3.7 | 6.8 | 3.9 | 5.0 | 4.2 | 4.8 | 4.2 | 4.2 | 0.0 |
| $C_6$ | 0.6 | 0.4 | 1.4 | 0.8 | 0.0 | 0.0 | 0.0 | 0.0 | 0.0 | 0.0 |
| $H_2S$ | 2.9 | 3.3 | 4.5 | 3.8 | 3.9 | 3.4 | 4.1 | 4.8 | 6.3 | 4.6 |

TABLE 8

Overall Material, Carbon, and Hydrogen Balances for SPR-64 (Sunnyside)

| | Material | Carbon | Hydrogen |
|---|---|---|---|
| IN | | | |
| Tar sand | | | |
| bitumen | 6,514 | 5,622 | 762 |
| sand | 53,174 | | |
| connate water | 240 | | 27 |
| Heavy oil | 16,298 | 13,870 | 2,347 |
| Product oil | 7,663 | 6,583 | 1,035 |
| Total in, grams | 83,889 | 26,075 | 4,171 |
| OUT | | | |
| Spent sand | 51,903 | 623 | 52 |
| Product oil | | | |
| KO1 | 3,808 | 3,258 | 532 |
| KO2 | 4,410 | 3,793 | 591 |
| KO3 | 1,164 | 1,007 | 151 |
| Heavy oil | 18,831 | 16,144 | 2,504 |
| Product water | 221 | | 25 |
| Product gas | 614 | 450 | 105 |
| Total out, grams | 80,951 | 25,275 | 3,960 |
| % Recovery | 96.5 | 96.9 | 94.9 |

TABLE 9

Product Gas Composition (Dry Basis) from Sunnyside Tar Sand Test

| SPR Test No. | 64 | MBFA |
|---|---|---|
| Gas Components (vol. %) | | |
| $H_2$ | 23.4 | 26.2 |
| CO | 1.4 | 3.0 |
| $CO_2$ | 7.5 | 8.7 |
| $CH_4$ | 21.9 | 34.5 |
| $C_2=$ | 8.0 | 2.8 |
| $C_2$ | 9.7 | 9.0 |
| $C_3=$ | 9.0 | 4.1 |
| $C_3$ | 6.2 | 5.0 |
| $C_4$ | 9.1 | 4.1 |
| $C_5$ | 4.1 | — |
| $C_6$ | — | — |
| $H_2S$ | 0.1 | 2.6 |

TABLE 10

Hydrocarbon Type Distribution of the IBP-177° C. Distillate Fraction of Samples Collected from Knock Out Receiver 1 Using Asphalt Ridge Tar Sand as the Resource

| Example of Hydrocarbon Class | Relative Weight Percentage | | | |
|---|---|---|---|---|
| | 370° C. | 385° C. | 400° C. | 415° C. |
| Alkanes | 89.1 | 87.4 | 90.3 | 88.7 |
| Monocycloalkanes | 3.0 | 2.3 | 2.0 | 2.1 |
| Alkenes | 3.4 | 4.6 | 4.6 | 4.3 |
| Dicycloalkanes | 0.0 | 0.0 | 0.0 | 0.0 |
| Tricycloalkanes | 0.0 | 0.0 | 0.0 | 0.0 |
| Total Saturates | 95.4 | 94.3 | 96.9 | 95.1 |
| Alkylbenzenes | 4.5 | 5.7 | 3.1 | 4.9 |
| Indans/Tetralins | 0.0 | 0.0 | 0.0 | 0.0 |
| Naphthalenes | 0.0 | 0.0 | 0.0 | 0.0 |
| Fluorenes | 0.0 | 0.0 | 0.0 | 0.0 |
| Anthracenes/Phenanthrenes | 0.0 | 0.0 | 0.0 | 0.0 |
| Total Aromatics | 4.6 | 5.7 | 3.1 | 4.9 |
| Wt. Percentage in Sample | 86.1 | 93.0 | 94.8 | 93.2 |

TABLE 11

Hydrocarbon Type Distribution of the IBP-177° C. Distillate Fraction of Samples Collected from Knock Out Receiver 2 Using Asphalt Ridge Tar Sand as the Resource

| Example of Hydrocarbon Class | Relative Weight Percentage | | | |
|---|---|---|---|---|
| | 370° C. | 385° C. | 400° C. | 415° C. |
| Alkanes | 75.2 | 89.4 | 63.3 | |
| Monocycloalkanes | 2.7 | 1.5 | 4.9 | |
| Alkenes | 4.5 | 2.3 | 5.2 | |
| Dicycloalkanes | 0.0 | 0.0 | 0.0 | |
| Tricycloalkanes | 0.0 | 0.0 | 0.0 | |
| Total Saturates | 82.4 | 93.2 | 73.4 | |
| Alkylbenzenes | 17.6 | 6.8 | 26.6 | |
| Indans/Tetralins | 0.0 | 0.0 | 0.0 | |
| Naphthalenes | 0.0 | 0.0 | 0.0 | |
| Fluorenes | 0.0 | 0.0 | 0.0 | |
| Anthracenes/Phenanthrenes | 0.0 | 0.0 | 0.0 | |
| Total Aromatics | 17.6 | 6.8 | 26.6 | |
| Wt. Percentage in Sample | 41.8 | 60.7 | 32.7 | |

TABLE 12

Hydrocarbon Type Distribution of the IBP-177° C. Distillate Fraction of Samples Collected from Knock Out Receiver 3 Using Asphalt Ridge Tar Sand as the Resource

| Example of Hydrocarbon Class | Relative Weight Percentage | | | |
|---|---|---|---|---|
| | 370° C. | 385° C. | 400° C. | 415° C. |
| Alkanes | 67.5 | 85.5 | 91.9 | 79.0 |
| Monocycloalkanes | 5.3 | 2.0 | 1.1 | 1.9 |
| Alkenes | 1.2 | 3.0 | 1.6 | 3.5 |
| Dicycloalkanes | 0.0 | 0.0 | 0.0 | 0.0 |
| Tricycloalkanes | 0.0 | 0.0 | 0.0 | 0.0 |
| Total Saturates | 74.0 | 90.6 | 94.5 | 84.4 |
| Alkylbenzenes | 26.0 | 9.4 | 5.5 | 15.6 |
| Indans/Tetralins | 0.0 | 0.0 | 0.0 | 0.0 |
| Naphthalenes | 0.0 | 0.0 | 0.0 | 0.0 |
| Fluorenes | 0.0 | 0.0 | 0.0 | 0.0 |
| Anthracenes/Phenanthrenes | 0.0 | 0.0 | 0.0 | 0.0 |
| Total Aromatics | 26.0 | 9.4 | 5.5 | 15.6 |
| Wt. Percentage in Sample | 27.1 | 65.4 | 69.0 | 68.3 |

TABLE 13

Hydrocarbon Type Distribution of the 177-371° C. Distillate Fraction of Samples Collected from Knock Out Receiver 1 Using Asphalt Ridge Tar Sand as the Resource

| Example of Hydrocarbon Class | Relative Weight Percentage | | | |
|---|---|---|---|---|
| | 370° C. | 385° C. | 400° C. | 415° C. |
| Alkanes | 15.5 | 18.2 | 23.0 | 17.3 |
| Monocycloalkanes | 2.3 | 0.9 | 0.9 | 0.3 |
| Alkenes | 25.9 | 27.0 | 36.2 | 30.7 |
| Dicycloalkanes | 1.2 | 0.0 | 0.0 | 0.0 |
| Tricycloalkanes | 1.6 | 0.0 | 0.0 | 0.0 |
| Total Saturates | 46.5 | 46.1 | 60.2 | 48.2 |
| Alkylbenzenes | 33.5 | 43.5 | 32.3 | 40.5 |
| Indans/Tetralins | 18.4 | 10.3 | 7.0 | 11.0 |
| Naphthalenes | 1.4 | 0.1 | 0.4 | 0.4 |
| Fluorenes | 0.2 | 0.0 | 0.0 | 0.0 |
| Anthracenes/Phenanthrenes | 0.0 | 0.0 | 0.0 | 0.0 |
| Total Aromatics | 53.5 | 53.9 | 39.8 | 51.8 |
| Wt. Percentage in Sample | 13.9 | 7.0 | 5.2 | 6.8 |

TABLE 14

Hydrocarbon Type Distribution of the 177-371° C. Distillate Fraction of Samples Collected from Knock Out Receiver 2 Using Asphalt Ridge Tar Sand as the Resource

| Example of Hydrocarbon Class | Relative Weight Percentage | | |
|---|---|---|---|
| | 385° C. | 400° C. | 415° C. |
| Alkanes | 37.3 | 41.9 | 59.1 |
| Monocycloalkanes | 0.0 | 0.0 | 0.0 |
| Alkenes | 22.1 | 28.6 | 10.5 |
| Dicycloalkanes | 0.0 | 0.0 | 0.0 |
| Tricycloalkanes | 0.0 | 0.0 | 0.0 |
| Total Saturates | 59.4 | 70.5 | 69.6 |
| Alkylbenzenes | 15.1 | 11.5 | 14.5 |
| Indans/Tetralins | 19.0 | 12.9 | 9.1 |
| Naphthalenes | 5.8 | 4.9 | 5.4 |
| Fluorenes | 0.4 | 0.2 | 0.0 |
| Anthracenes/Phenanthrenes | 0.3 | 0.0 | 1.4 |
| Total Aromatics | 40.6 | 29.5 | 30.4 |
| Wt. Percentage in Sample | 57.6 | 39.1 | 27.4 |

TABLE 15

Hydrocarbon Type Distribution of the 177-371° C. Distillate Fraction of Samples Collected from Knock Out Receiver 3 Using Asphalt Ridge Tar Sand as the Resource

| Example of Hydrocarbon Class | Relative Weight Percentage | | | |
|---|---|---|---|---|
| | 370° C. | 385° C. | 400° C. | 415° C. |
| Alkanes | 37.4 | 54.4 | 67.2 | 59.1 |
| Monocycloalkanes | 0.0 | 0.0 | 0.0 | 0.0 |

TABLE 15-continued

Hydrocarbon Type Distribution of the 177-371° C. Distillate Fraction of Samples Collected from Knock Out Receiver 3 Using Asphalt Ridge Tar Sand as the Resource

| Example of Hydrocarbon Class | Relative Weight Percentage | | | |
|---|---|---|---|---|
| | 370° C. | 385° C. | 400° C. | 415° C. |
| Alkenes | 7.3 | 14.1 | 16.0 | 10.5 |
| Dicycloalkanes | 0.0 | 0.0 | 0.0 | 0.0 |
| Tricycloalkanes | 2.8 | 0.0 | 0.0 | 0.0 |
| Total Saturates | 47.5 | 68.5 | 83.2 | 69.6 |
| Alkylbenzenes | 11.6 | 10.2 | 4.1 | 14.5 |
| Indans/Tetralins | 28.5 | 12.8 | 7.3 | 9.1 |
| Naphthalenes | 11.7 | 7.3 | 4.8 | 5.4 |
| Fluorenes | 0.7 | 0.4 | 0.2 | 0.0 |
| Anthracenes/Phenanthrenes | 0.0 | 0.7 | 0.4 | 1.4 |
| Total Aromatics | 52.5 | 31.5 | 16.8 | 30.4 |
| Wt. Percentage in Sample | 70.6 | 30.6 | 28.5 | 27.4 |

TABLE 16

Hydrocarbon Type Distribution of the IBP-177° C. Distillate Fraction of Samples Collected from Knock Out Receiver 1 Using Sunnyside Tar Sand as the Resource

| Example of Hydrocarbon Class | Relative Weight Percentage | | | |
|---|---|---|---|---|
| | A | B | C | D |
| Alkanes | 54.9 | 86.8 | 72.8 | 88.1 |
| Monocycloalkanes | 8.0 | 4.1 | 6.0 | 2.9 |
| Alkenes | 5.1 | 2.0 | 1.2 | 1.3 |
| Dicycloalkanes | 0.0 | 0.0 | 0.0 | 0.0 |
| Tricycloalkanes | 0.0 | 0.0 | 0.0 | 0.0 |
| Total Saturates | 68.0 | 92.8 | 80.0 | 92.2 |
| Alkylbenzenes | 32.0 | 7.2 | 20.0 | 7.8 |
| Indans/Tetralins | 0.0 | 0.0 | 0.0 | 0.0 |
| Naphthalenes | 0.0 | 0.0 | 0.0 | 0.0 |
| Fluorenes | 0.0 | 0.0 | 0.0 | 0.0 |
| Anthracenes/Phenanthrenes | 0.0 | 0.0 | 0.0 | 0.0 |
| Total Aromatics | 32.0 | 7.2 | 20.0 | 7.8 |
| Wt. Percentage in Sample | 59.7 | 81.3 | 60.0 | 62.7 |

TABLE 17

Hydrocarbon Type Distribution of the IBP-177° C. Distillate Fraction of Samples Collected from Knock Out Receiver 2 Using Sunnyside Tar Sand as the Resource

| Example of Hydrocarbon Class | Relative Weight Percentage | | | |
|---|---|---|---|---|
| | A | B | C | D |
| Alkanes | 73.4 | 79.3 | 69.5 | 0.0 |
| Monocycloalkanes | 2.4 | 1.8 | 3.7 | 1.8 |
| Alkenes | 0.4 | 0.1 | 1.1 | 2.2 |
| Dicycloalkanes | 0.0 | 0.0 | 0.0 | 0.0 |
| Tricycloalkanes | 0.0 | 0.0 | 0.0 | 0.0 |
| Total Saturates | 76.1 | 81.2 | 74.3 | 4.0 |
| Alkylbenzenes | 23.9 | 18.8 | 25.7 | 96.0 |
| Indans/Tetralins | 0.0 | 0.0 | 0.0 | 0.0 |
| Naphthalenes | 0.0 | 0.0 | 0.0 | 0.0 |
| Fluorenes | 0.0 | 0.0 | 0.0 | 0.0 |
| Anthracenes/Phenanthrenes | 0.0 | 0.0 | 0.0 | 0.0 |
| Total Aromatics | 23.9 | 18.8 | 25.7 | 96.0 |
| Wt. Percentage in Sample | 44.4 | 31.1 | 38.5 | 17.7 |

TABLE 18

Hydrocarbon Type Distribution of the IBP-177° C. Distillate Fraction of Samples Collected from Knock Out Receiver 3 Using Sunnyside Tar Sand as the Resource

| Example of Hydrocarbon Class | Relative Weight Percentage | | | |
|---|---|---|---|---|
| | A | B | C | D |
| Alkanes | 63.8 | 82.1 | 85.7 | 61.0 |
| Monocycloalkanes | 2.3 | 2.7 | 3.3 | 1.8 |
| Alkenes | 0.7 | 1.0 | 1.2 | 1.2 |
| Dicycloalkanes | 0.0 | 0.0 | 0.0 | 0.0 |

TABLE 18-continued
Hydrocarbon Type Distribution of the IBP-177° C. Distillate Fraction of Samples Collected from Knock Out Receiver 3 Using Sunnyside Tar Sand as the Resource

| Example of Hydrocarbon Class | Relative Weight Percentage | | | |
|---|---|---|---|---|
| | A | B | C | D |
| Tricycloalkanes | 0.0 | 0.0 | 0.0 | 0.0 |
| Total Saturates | 66.8 | 85.9 | 90.3 | 64.0 |
| Alkylbenzenes | 33.2 | 14.0 | 9.7 | 35.7 |
| Indans/Tetralins | 0.0 | 0.1 | 0.0 | 0.3 |
| Naphthalenes | 0.0 | 0.0 | 0.0 | 0.0 |
| Fluorenes | 0.0 | 0.0 | 0.0 | 0.0 |
| Anthracenes/Phenanthrenes | 0.0 | 0.0 | 0.0 | 0.0 |
| Total Aromatics | 33.2 | 14.1 | 9.7 | 36.0 |
| Wt. Percentage in Sample | 69.8 | 72.4 | 82.2 | 51.6 |

TABLE 19
Hydrocarbon Type Distribution of the IBP-177° C. Distillate Fraction of Samples Collected from Knock Out Receiver 4 Using Sunnyside Tar Sand as the Resource

| Example of Hydrocarbon Class | Relative Weight Percentage | | | |
|---|---|---|---|---|
| | A | B | C | D |
| Alkanes | 77.4 | 71.1 | 22.4 | 66.5 |
| Monocycloalkanes | 0.0 | 3.4 | 4.7 | 2.5 |
| Alkenes | 0.3 | 0.5 | 2.1 | 1.7 |
| Dicycloalkanes | 0.0 | 0.0 | 0.0 | 0.0 |
| Tricycloalkanes | 0.0 | 0.0 | 0.0 | 0.0 |
| Total Saturates | 77.7 | 75.1 | 29.2 | 70.7 |
| Alkylbenzenes | 22.3 | 24.9 | 68.6 | 29.1 |
| Indans/Tetralins | 0.0 | 0.0 | 2.2 | 0.2 |
| Naphthalenes | 0.0 | 0.0 | 0.0 | 0.0 |
| Fluorenes | 0.0 | 0.0 | 0.0 | 0.0 |
| Anthracenes/Phenanthrenes | 0.0 | 0.0 | 0.0 | 0.0 |
| Total Aromatics | 22.3 | 24.9 | 70.8 | 29.3 |
| Wt. Percentage in Sample | 60.4 | 61.8 | 45.9 | 56.8 |

TABLE 20
Hydrocarbon Type Distribution of the 177-371° C. Distillate Fraction of Samples Collected from Knock Out Receiver 1 Using Sunnyside Tar Sand as the Resource

| Example of Hydrocarbon Class | Relative Weight Percentage | | | |
|---|---|---|---|---|
| | A | B | C | D |
| Alkanes | 20.8 | 14.7 | 23.0 | 17.0 |
| Monocycloalkanes | 0.3 | 0.4 | 0.0 | 0.1 |
| Alkenes | 8.5 | 8.5 | 3.3 | 8.3 |
| Dicycloalkanes | 0.0 | 0.2 | 0.0 | 0.5 |
| Tricycloalkanes | 0.9 | 1.9 | 1.3 | 2.4 |
| Total Saturates | 30.5 | 25.6 | 27.6 | 28.4 |
| Alkylbenzenes | 30.3 | 34.6 | 26.7 | 21.4 |
| Indans/Tetralins | 29.9 | 32.8 | 32.5 | 39.3 |
| Naphthalenes | 9.0 | 6.7 | 12.1 | 10.5 |
| Fluorenes | 0.2 | 0.2 | 1.0 | 0.4 |
| Anthracenes/Phenanthrenes | 0.0 | 0.0 | 0.0 | 0.0 |
| Total Aromatics | 69.5 | 74.4 | 72.4 | 71.6 |
| Wt. Percentage in Sample | 40.3 | 18.7 | 40.0 | 37.3 |

TABLE 21
Hydrocarbon Type Distribution of the 177-371° C. Distillate Fraction of Samples Collected from Knock Out Receiver 2 Using Sunnyside Tar Sand as the Resource

| Example of Hydrocarbon Class | Relative Weight Percentage | | | |
|---|---|---|---|---|
| | A | B | C | D |
| Alkanes | 32.2 | 35.7 | 40.4 | 12.9 |
| Monocycloalkanes | 0.0 | 0.0 | 0.0 | 0.0 |
| Alkenes | 2.2 | 0.9 | 3.3 | 0.4 |
| Dicycloalkanes | 0.0 | 0.0 | 0.0 | 0.0 |
| Tricycloalkanes | 0.9 | 2.9 | 4.0 | 7.2 |

TABLE 21-continued
Hydrocarbon Type Distribution of the 177-371° C. Distillate Fraction of Samples Collected from Knock Out Receiver 2 Using Sunnyside Tar Sand as the Resource

| Example of Hydrocarbon Class | Relative Weight Percentage | | | |
|---|---|---|---|---|
| | A | B | C | D |
| Total Saturates | 35.3 | 39.5 | 47.7 | 20.6 |
| Alkylbenzenes | 21.3 | 8.6 | 10.2 | 10.0 |
| Indans/Tetralins | 27.6 | 28.4 | 18.9 | 19.0 |
| Naphthalenes | 14.3 | 18.2 | 17.3 | 27.6 |
| Fluorenes | 1.5 | 4.9 | 5.7 | 20.2 |
| Anthracenes/Phenanthrenes | 0.0 | 0.3 | 0.1 | 2.6 |
| Total Aromatics | 64.7 | 60.5 | 52.3 | 79.4 |
| Wt. Percentage in Sample | 55.4 | 68.4 | 60.3 | 82.0 |

TABLE 22
Hydrocarbon Type Distribution of the 177-371° C. Distillate Fraction of Samples Collected from Knock Out Receiver 3 Using Sunnyside Tar Sand as the Resource

| Example of Hydrocarbon Class | Relative Weight Percentage | | | |
|---|---|---|---|---|
| | A | B | C | D |
| Alkanes | 16.3 | 18.8 | 27.7 | 8.5 |
| Monocycloalkanes | 0.0 | 0.0 | 0.0 | 0.0 |
| Alkenes | 1.1 | 2.4 | 2.2 | 1.1 |
| Dicycloalkanes | 2.5 | 0.0 | 0.0 | 0.0 |
| Tricycloalkanes | 0.0 | 5.0 | 3.2 | 8.0 |
| Total Saturates | 19.9 | 26.2 | 33.2 | 17.5 |
| Alkylbenzenes | 23.4 | 17.7 | 23.7 | 12.0 |
| Indans/Tetralins | 20.2 | 21.7 | 21.8 | 18.3 |
| Naphthalenes | 29.9 | 24.1 | 15.9 | 33.1 |
| Fluorenes | 6.5 | 9.8 | 5.0 | 17.4 |
| Anthracenes/Phenanthrenes | 0.2 | 0.8 | 0.4 | 1.7 |
| Total Aromatics | 80.1 | 73.8 | 66.8 | 82.5 |
| Wt. Percentage in Sample | 30.1 | 27.4 | 17.3 | 48.2 |

TABLE 23
Hydrocarbon Type Distribution of the 177-371° C. Distillate Fraction of Samples Collected from Knock Out Receiver 4 Using Sunnyside Tar Sand as the Resource

| Example of Hydrocarbon Class | Relative Weight Percentage | | | |
|---|---|---|---|---|
| | A | B | C | D |
| Alkanes | 37.9 | 19.7 | 9.5 | 9.6 |
| Monocycloalkanes | 0.0 | 0.0 | 1.3 | 0.0 |
| Alkenes | 2.2 | 4.3 | 3.5 | 4.2 |
| Dicycloalkanes | 0.0 | 0.0 | 0.0 | 0.0 |
| Tricycloalkanes | 1.5 | 3.4 | 5.6 | 3.1 |
| Total Saturates | 41.6 | 27.4 | 19.9 | 16.8 |
| Alkylbenzenes | 17.1 | 18.4 | 12.4 | 22.9 |
| Indans/Tetralins | 21.4 | 25.3 | 23.5 | 30.1 |
| Naphthalenes | 18.2 | 21.6 | 28.4 | 21.9 |
| Fluorenes | 1.7 | 7.0 | 13.8 | 7.5 |
| Anthracenes/Phenanthrenes | 0.0 | 0.4 | 2.0 | 0.8 |
| Total Aromatics | 58.4 | 72.6 | 80.1 | 83.2 |
| Wt. Percentage in Sample | 36.2 | 27.2 | 53.5 | 43.0 |

TABLE 24

| Fischer Assay Product Yields | | | |
|---|---|---|---|
| | New Albany Shale | AMAX Shale | Israeli Shale |
| Oil, Wt % | 5.3 | 1.9 | 5.5 |
| Gallons/Ton | 13.4 | 4.6 | 13.7 |
| Water, Wt % | 2.2 | 7.0 | 4.5 |
| Spent Shale, Wt % | 89.0 | 88.9 | 86.4 |
| Gas + Loss, Wt % | 3.5 | 2.2 | 3.6 |
| Specific Gravity of Oil | 0.944 | 0.979 | 0.962 |

TABLE 25
Product Yield from ROPE © Tests

|  | New Albany Shale | AMAX Shale | Israeli Shale |
|---|---|---|---|
| Oil, Wt % | 7.3 | 2.8 | 7.4 |
| Gallons/Ton | 21.2 | 8.0 | 21.3 |
| % FA by Weight | 137.0 | 148.0 | 134.0 |
| % FA by Volume | 158.0 | 174.0 | 156.0 |
| Water, Wt % | 2.1 | 7.1 | 3.6 |
| Gas, Wt % | 3.0 | 4.6 | 6.7 |
| Spent Shale, Wt % | 87.3 | 85.5 | 82.3 |

TABLE 26
Composition of New Albany Shale Oil

|  | Light Distillate | Middle Distillate | Heavy Distillate |
|---|---|---|---|
| Carbon, Wt % | 82.1 | 86.1 | 85.8 |
| Hydrogen, Wt % | 13.0 | 12.7 | 12.7 |
| Nitrogen, Wt % | 0.2 | 0.3 | 0.4 |
| Sulfur, Wt % | 0.82 | 0.94 | 0.91 |
| Specific Gravity | 0.806 | 0.865 | 0.882 |
| API Gravity | 44.1 | 32.1 | 28.9 |
| H/C Ratio | 1.90 | 1.77 | 1.78 |

TABLE 27
Composition of AMAX Shale Oil

|  | Light Distillate | Middle Distillate | Heavy Distillate |
|---|---|---|---|
| Carbon, Wt % | 83.1 | 85.1 | 85.3 |
| Hydrogen, Wt % | 13.2 | 13.4 | 13.7 |
| Nitrogen, Wt % | 0.12 | 0.13 | 0.13 |
| Sulfur, Wt % | 0.82 | 0.66 | 0.60 |
| Specific Gravity | 0.841 | 0.85 | 0.86 |
| API Gravity | 36.8 | 35.0 | 33.0 |
| H/C Ratio | 1.91 | 1.89 | 1.93 |

TABLE 28
Composition of Israeli Shale Oil

|  | Light Distillate | Middle Distillate | Heavy Distillate |
|---|---|---|---|
| Carbon, Wt % | 83.9 | 84.2 | 83.6 |
| Hydrogen, Wt % | 12.9 | 12.5 | 12.5 |
| Nitrogen, Wt % | 0.20 | 0.3 | 0.3 |
| Sulfur, Wt % | 2.00 | 2.2 | 2.0 |
| Specific Gravity | 0.821 | 0.884 | 0.879 |
| API Gravity | 40.9 | 28.6 | 29.5 |
| H/C Ratio | 1.85 | 1.78 | 1.79 |

TABLE 29
Composition of Shale Oil Produced From Typical Combustion Retorting Process

|  | New Albany Shale | Israeli Shale |
|---|---|---|
| Carbon, Wt % | 83.2 | 79.1 |
| Hydrogen, Wt % | 11.8 | 9.2 |
| Nitrogen, Wt % | 0.7 | 1.4 |
| Sulfur, Wt % | 4.7 | 6.9 |
| Specific Gravity | 0.885 | 0.988 |
| API Gravity | 28.4 | 11.7 |
| H/C Ratio | 1.69 | 1.40 |

TABLE 30
Product Gas Composition (New Albany Oil Shale)
Volume % on Dry Basis

| Component | Rope Test | FA |
|---|---|---|
| $H_2$ | 30.65 | 26.30 |
| CO | 1.14 | 1.84 |
| $CO_2$ | 3.79 | 6.03 |
| $CH_4$ | 12.98 | 19.07 |
| $C_2H_6$ | 6.10 | 6.23 |
| $C_2H_4$ | 0.98 | 1.41 |
| $C_3H_8$ | 3.74 | 1.99 |
| $C_3H_6$ | 1.57 | 1.36 |
| $C_4$'s | 3.88 | 0.55 |
| $C_5$'s | 1.75 | 0.00 |
| $H_2S$ | 33.41 | 35.07 |

TABLE 31
Combustion Test Results

|  | Western Oil Shale | | Eastern Oil Shale | |
|---|---|---|---|---|
|  | Raw Shale | Combusted Shale | Raw Shale | Combusted Shale |
| Mineral Carbon, Wt % | 4.10 | 1.0 | 0.25 | 0.12 |
| Organic Carbon, Wt % | 13.90 | 0.5 | 13.65 | 0.67 |
| Carbon Burned, % | 96.4 | | 95.1 | |

TABLE 32
Product Yield from Shredded Tire Pyrolysis (Experiment 1)

| Product | Weight % | 1-Ton Basis |
|---|---|---|
| Oil | 55.2 | 3.7 bbls/ton |
| Gas | 13.7 | 3,116 scf/ton |
| Carbon Black | 31.1 | 662 lbs/ton |

TABLE 33
Composition of Gas from Shredded Tire Pyrolysis (Experiment 1)

| Component | Volume % |
|---|---|
| Carbon monoxide | 4.9 |
| Carbon dioxide | 22.8 |
| Methane | 11.5 |
| Ethane | 3.5 |
| Ethylene | 43.0 |
| Propane | 2.4 |
| Propylene | 1.3 |
| $C_4$'s | 5.5 |
| $C_5$'s | 0.5 |
| $C_6$'s | 0.4 |
| $H_2S$ | 4.2 |

TABLE 34
Product Yield from Whole Tire Pyrolysis (Experiment 2)

| Product | Weight % |
|---|---|
| Oil | 36.0 |
| Gas | 20.0 |
| Wire | 14.4 |
| Carbon black | 29.6 |

Table 35
Composition of Product Gas from Whole Tire Pyrolysis (Experiment 2)

| Components | Volume % |
|---|---|
| $H_2$ | 18.67 |
| CO | 1.54 |
| $CO_2$ | 6.18 |
| $CH_4$ | 18.15 |
| $C_2H_6$ | 10.07 |
| $C_2H_4$ | 2.64 |
| $C_3H_8$ | 5.06 |
| $C_3H_6$ | 4.29 |
| $C_4$'s | 13.29 |
| $C_5$'s | 4.80 |

Table 35-continued

Composition of Product Gas from
Whole Tire Pyrolysis (Experiment 2)

| Components | Volume % |
|---|---|
| $C_6$'s | 4.87 |
| $C_7$'s | 2.92 |
| $C_8$'s | 2.52 |
| $C_9$'s | 0.94 |
| $C_{10}$'s | 1.14 |
| $H_2S$ | 1.83 |

TABLE 36

Product Yield From Shredded Tires and
Waste Motor Oil Pyrolysis (Experiment 3)

| Component | Volume % |
|---|---|
| Oil | 87.5 |
| Gas | 3.3 |
| Solid residue | 8.6 |
| Water | 0.6 |

TABLE 37

Composition of Product Gas from Shredded Tires
and Waste Motor Oil Pyrolysis (Experiment 3)

| Component | Volume % |
|---|---|
| $H_2$ | 1.28 |
| CO | 1.04 |
| $CO_2$ | 5.22 |
| $CH_4$ | 23.59 |
| $C_2H_6$ | 13.08 |
| $C_2H_4$ | 8.90 |
| $C_3H_8$ | 8.15 |
| $C_3H_6$ | 5.63 |
| $C_4$'s | 13.15 |
| $C_5$'s | 5.01 |
| $C_6$'s | 3.31 |
| $C_7$'s | 2.92 |
| $C_8$'s | 1.93 |
| $C_9$'s | 0.37 |
| $C_{10}$'s | 0.02 |
| $H_2S$ | 6.38 |

TABLE 38

Product Yield from Waste Motor Oil Pyrolysis

| Product | Weight % |
|---|---|
| Oil | 93.6 |
| Gas | 1.3 |
| Solid residue | 4.4 |
| Water | 0.7 |

TABLE 39

Product Yield from Shredded Tire Pyrolysis
with Product Oil (Experiment 4)

| Product | Weight % |
|---|---|
| Oil | 60.4 |
| Gas | 8.5 |
| Carbon black | 31.1 |

TABLE 40

Composition of Product Gas from Shredded Tire
Pyrolysis with Product Oil (Experiment 4)

| Component | Volume % |
|---|---|
| $H_2$ | 6.63 |
| CO | 1.11 |
| $CO_2$ | 11.54 |
| $CH_4$ | 9.80 |
| $C_2H_6$ | 4.50 |
| $C_2H_4$ | 4.08 |
| $C_3H_8$ | 3.40 |
| $C_3H_6$ | 2.21 |

TABLE 40-continued

Composition of Product Gas from Shredded Tire
Pyrolysis with Product Oil (Experiment 4)

| Component | Volume % |
|---|---|
| $C_4$'s | 18.60 |
| $C_5$'s | 8.20 |
| $C_6$'s | 7.74 |
| $C_7$'s | 6.76 |
| $C_8$'s | 6.60 |
| $C_9$'s | 2.68 |
| $C_{10}$'s | 3.01 |
| $H_2S$ | 0.89 |

TABLE 41

Product Oil Composition

| Experiment No. | 1 | 2 | 3 | 4 |
|---|---|---|---|---|
| Carbon (wt %) | 83.90 | 83.30 | 86.40 | 85.20 |
| Hydrogen (wt %) | 12.50 | 13.00 | 13.80 | 13.00 |
| Nitrogen (wt %) | 0.22 | 0.22 | 0.10 | 0.10 |
| Sulfur (wt %) | 1.19 | 0.56 | 0.84 | 0.73 |
| H/C ratio | 1.78 | 1.87 | 1.92 | 1.83 |

TABLE 42

Results of the Combined GC/MS Hydrocarbon Group
Type Analysis of Experiment 1 Product Oil

| Example of Hydrocarbon Class | Weight % |
|---|---|
| Alkanes | 31.4 |
| Monocycloalkanes and alkenes | 18.4 |
| Alkylbenzenes | 40.1 |
| Indans/tetralins | 7.2 |
| Naphthalenes | 1.4 |
| Phenanthrenes | 0.9 |
| Fluoranthenes | 0.4 |
| Chrysenes | 0.3 |

TABLE 43

Distribution of Alkylbenezenes by Number of
Carbon Atoms in the Product Oil (Experiment 1)

| Number of Carbon Atoms in Alkyl substituents | Weight % |
|---|---|
| 0 | 2.9 |
| 1 | 11.3 |
| 2 | 20.9 |
| 3 | 7.6 |
| 4 | 9.6 |
| 5 | 44.3 |
| 6 | 3.3 |
| Weight percent represented by alkylbenzenes | 40.1 |

TABLE 44

Hydrocarbon Group Type Distribution of the
Gasoline Distillate Range (IBP-400° F.) of
Experiment 1 Product Oil

| | Weight % | |
|---|---|---|
| Example of Hydrocarbon Class | Experiment 1 | Gasoline |
| Normal and branched alkanes | 4.1 | 15.3 |
| Monocycloalkanes and alkenes | 23.9 | 10.6 |
| Alkylbenzenes | 61.1 | 66.5 |
| Indans/tetralins | 10.9 | 3.1 |
| Weight percent of fraction represented by distillation range | 65.6 | |

TABLE 45

Hydrocarbon Group Type Distribution of the
Diesel Range (400–700° F.) of Experiment 1
Product Oil

| Example of Hydrocarbon Class | Weight % |
|---|---|
| Normal and branched alkanes | 72.9 |
| Alkenes | 10.3 |
| Indans/tetralins | 7.6 |
| Naphthalenes | 5.2 |
| Phenanthrenes | 3.3 |
| Fluoranthenes | 0.7 |
| Weight percent represented by distillation range | 26.3 |

What is claimed is:

1. A process for pyrolyzing a solid carbonaceous feed comprising:

forming a mixture of the solid feed with heavy product oil;

in a first retorting step, heating the mixture to a first temperature at substantially atmospheric pressure to form light oil, heavy oil, and solid residue;

recovering the heavy oil from the residue and recycling the heavy oil to the first retorting step;

in a second retorting step in a horizontal screw pyrolysis reactor, treating the residue at a second temperature at substantially atmospheric pressure, said second temperature being higher than said first temperature, said second retorting step completing pyrolysis of the residue and forming solid residue, product liquid and product gas; and separating said solid residue from said product liquid and product gas and combusting said solid residue in a fluidized bed to form combusted solid residue and flue gas;

wherein the hot flue gas downstream of said heavy oil heating step is used to heat air for the combustion step.

2. The process of claim 1 wherein the first temperature ranges of about 400°–500° F. and the second temperature ranges from about 500°–800° F.

3. The process of claim 1 wherein the retorting is conducted in a first heated treating zone, a second heated treating zone, and a third heated treating zone, each treating zone being heated separately from the other heating zones.

4. The process of claim 3 wherein heated recycled heavy oil is used to maintain the temperatures in the heated treating zones.

5. The process of claim 3 wherein the temperature in the first treating zone ranges from about 450°–500° F., the temperature in the second treating zone ranges from about 650°–750° F., and the temperature in the third heating zone ranges from about 725° to about 800° F.

6. The process of claim 1 wherein the solid feed is scrap tires.

7. The process of claim 1 wherein the solid feed is tar sand.

8. The process of claim 1 wherein the solid feed is oil shale.

9. The process of claim 1 wherein the solid feed is scrap tires and waste oil.

10. The process of claim 1 wherein the solid feed is mixed with heavy product oil at a weight ratio of from about 3:1 to about 1:1.

11. The process of claim 1 wherein a part of the product gas is recycled to the first retorting step.

12. The process of claim 1 wherein a part of the product gas is recycled to the first retorting step.

13. The process according to claim 1 wherein flue gas from the combustion step is used to heat heavy product oil for the first retorting step.

14. The process according to claim 1 wherein combustion is effected in an inclined fluidized bed.

15. The process according to claim 1 wherein flue gas from the combustion step is used to provide heat to the second retorting step.

16. The process according to claim 1 wherein the combusted solid residue is separated from the flue gas in a cyclone separator.

17. The process according to claim 11 wherein a part of the product gas is used in the combustion step.

18. The process according to claim 11 wherein flue gas from the combustion step is used to heat heavy product oil for the first retorting step.

19. The process according to claim 1 wherein said solid carbonaceous feed is selected form the group consisting of tar sand, oil shale, scrap rubber, and waste oil.

* * * * *